(12) United States Patent
ChoFleming

(10) Patent No.: US 11,385,873 B2
(45) Date of Patent: Jul. 12, 2022

(54) CONTROL SPECULATION IN DATAFLOW GRAPHS

(71) Applicant: Intel Corporation, Santa Clara, CA (US)

(72) Inventor: Kermin ChoFleming, Hudson, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/113,185

(22) Filed: Dec. 7, 2020

(65) Prior Publication Data
US 2021/0165642 A1    Jun. 3, 2021

Related U.S. Application Data

(63) Continuation of application No. 16/456,953, filed on Jun. 28, 2019, now Pat. No. 10,860,301.

(51) Int. Cl.
*G06F 8/41*    (2018.01)
*G06F 12/10*    (2016.01)

(52) U.S. Cl.
CPC .............. *G06F 8/433* (2013.01); *G06F 12/10* (2013.01); *G06F 2212/65* (2013.01)

(58) Field of Classification Search
None
See application file for complete search history.

(56) References Cited

U.S. PATENT DOCUMENTS

| | | | |
|---|---|---|---|
| 6,260,190 B1* | 7/2001 | Ju ........................... | G06F 8/445 712/205 |
| 6,526,572 B1* | 2/2003 | Brauch .................. | G06F 8/441 712/226 |
| 6,539,541 B1* | 3/2003 | Geva ....................... | G06F 8/443 712/233 |
| 6,615,403 B1* | 9/2003 | Muthukumar .......... | G06F 8/433 712/E9.05 |
| 6,832,370 B1* | 12/2004 | Srinivasan ............ | G06F 8/4452 712/241 |
| 10,515,049 B1 | 12/2019 | Fleming et al. | |
| 2003/0233643 A1* | 12/2003 | Thompson ............ | G06F 8/4452 717/161 |
| 2005/0013183 A1 | 1/2005 | Southwell | |
| 2013/0191817 A1 | 7/2013 | Vorbach | |
| 2015/0007154 A1 | 1/2015 | Bharadwaj et al. | |

(Continued)

OTHER PUBLICATIONS

Notice of Allowance for U.S. Appl. No. 16/456,953, dated Jul. 21, 2020, 15 pages.

(Continued)

*Primary Examiner* — Qing Chen
(74) *Attorney, Agent, or Firm* — Jordan IP Law, LLC

(57) ABSTRACT

Systems, apparatuses and methods may provide for technology that determines that a control loop is to be executed for an unspecified number of iterations and automatically forces the control loop to be executed for a fixed number of iterations in addition to the unspecified number of iterations, where execution of the control loop for the fixed number of iterations is conducted in parallel. In one example, the technology also removes one or more dataflow tokens associated with the execution of the control loop for the fixed number of iterations.

24 Claims, 20 Drawing Sheets

(56) References Cited

U.S. PATENT DOCUMENTS

2019/0102338 A1  4/2019  Tang et al.
2019/0205269 A1  7/2019  Fleming et al.

OTHER PUBLICATIONS

Extended European Search Report for European Patent Application No. 201166246.7, dated Nov. 30, 2020, 11 pages.
Josipovic et al., "Speculative Dataflow Circuits," International Symposium on Field-Progammable Gate Arrays, Feb. 24-26, 2019, pp. 162-171.
Gadke et al., "Accelerating Speculative Execution in High Level Synthesis with Cancel Token," 26, Mar. 2008, pp. 185-195.

* cited by examiner

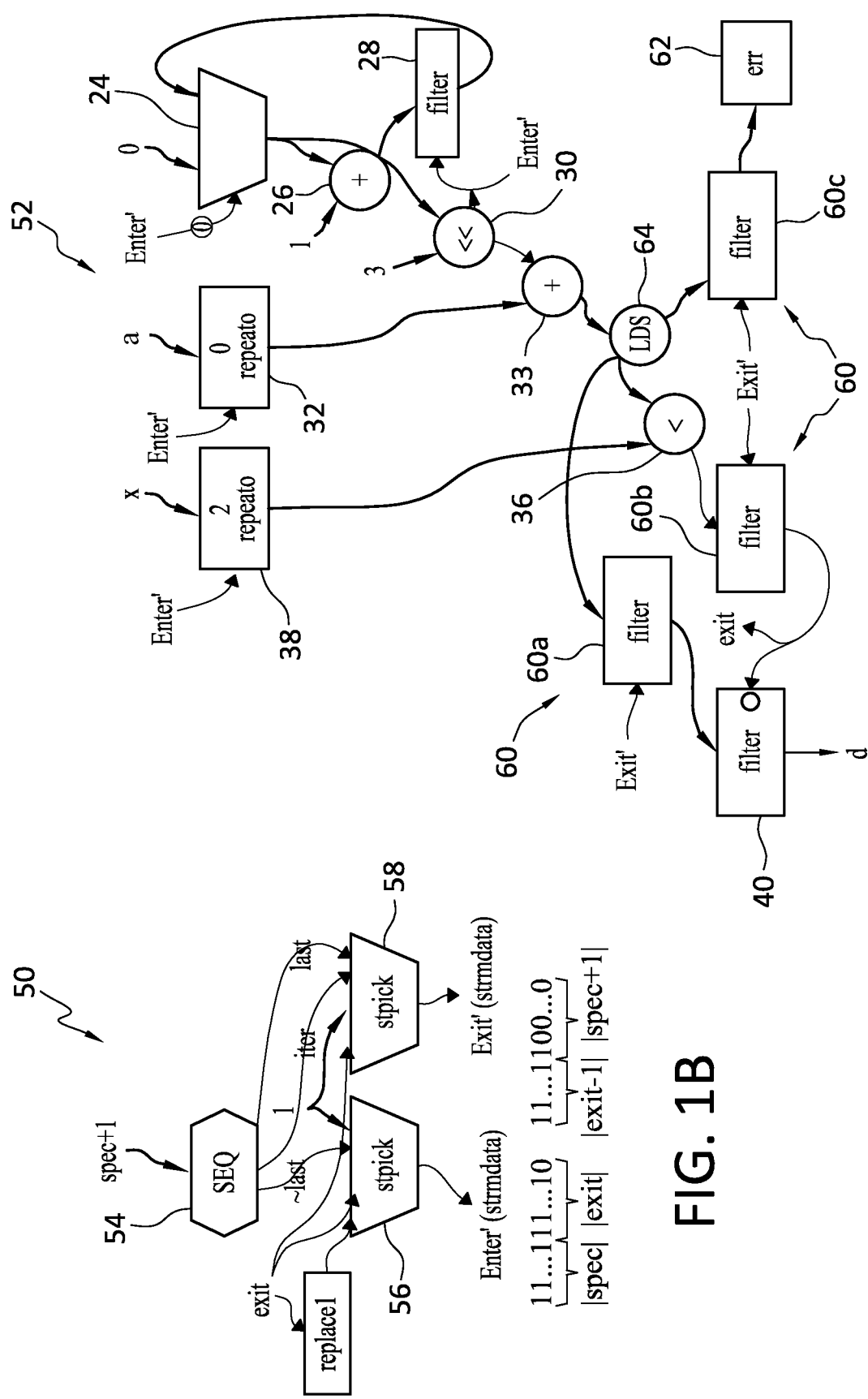

135

Operation: lds{8-64} data.CRd.iN, succ.CRd.i1, addr.CRLu.a64, spec.CRLu.i1, outord.CRd.i0=I, inord.CRu.i0=I, memlvl.Lu.i64=T, xoutord.CRd.i0=I

Description: Speculative load of memory. Loads memory at the location referred to by address and returns in data. If operation succeeds, returns a logical true in succ. Spec provides hints to the operation about the speculative status of the particular operation, which is used in handling certain memory access types. If translation or operation would fail, returns a false in succ and a 0 or some other value in data. May fault if certain memory access types, such as I/O space, are detected at the discretion of the microarchitecture. Outord, inord, and xoutord are produced and consumed per operation execution.

FIG. 4

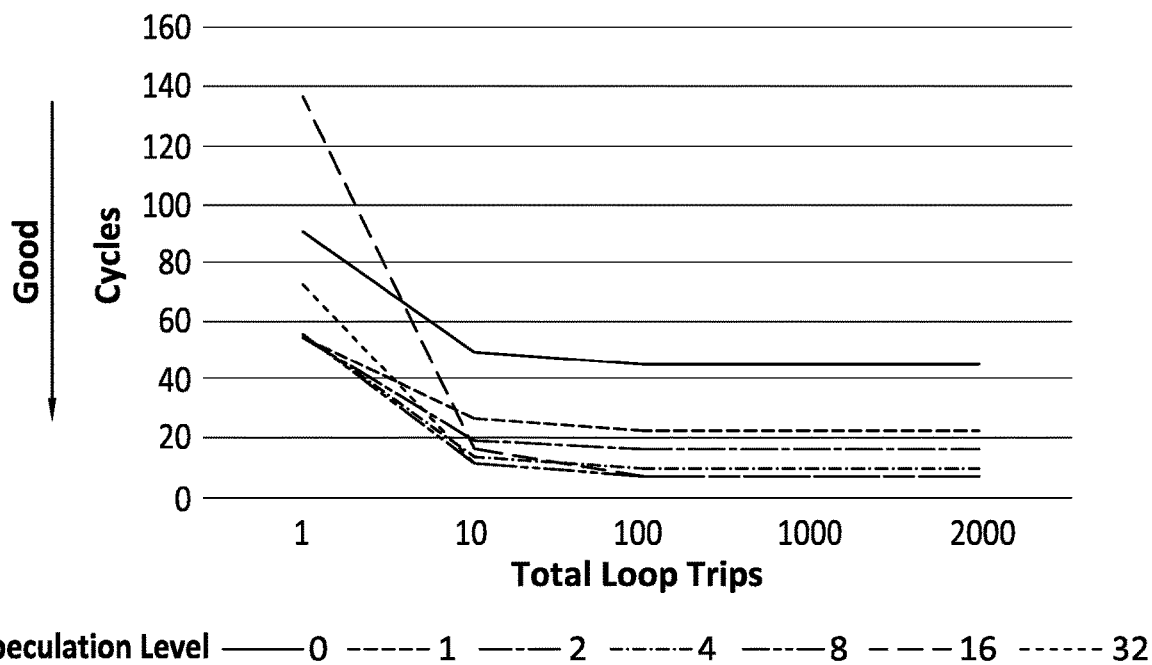

FIG. 5

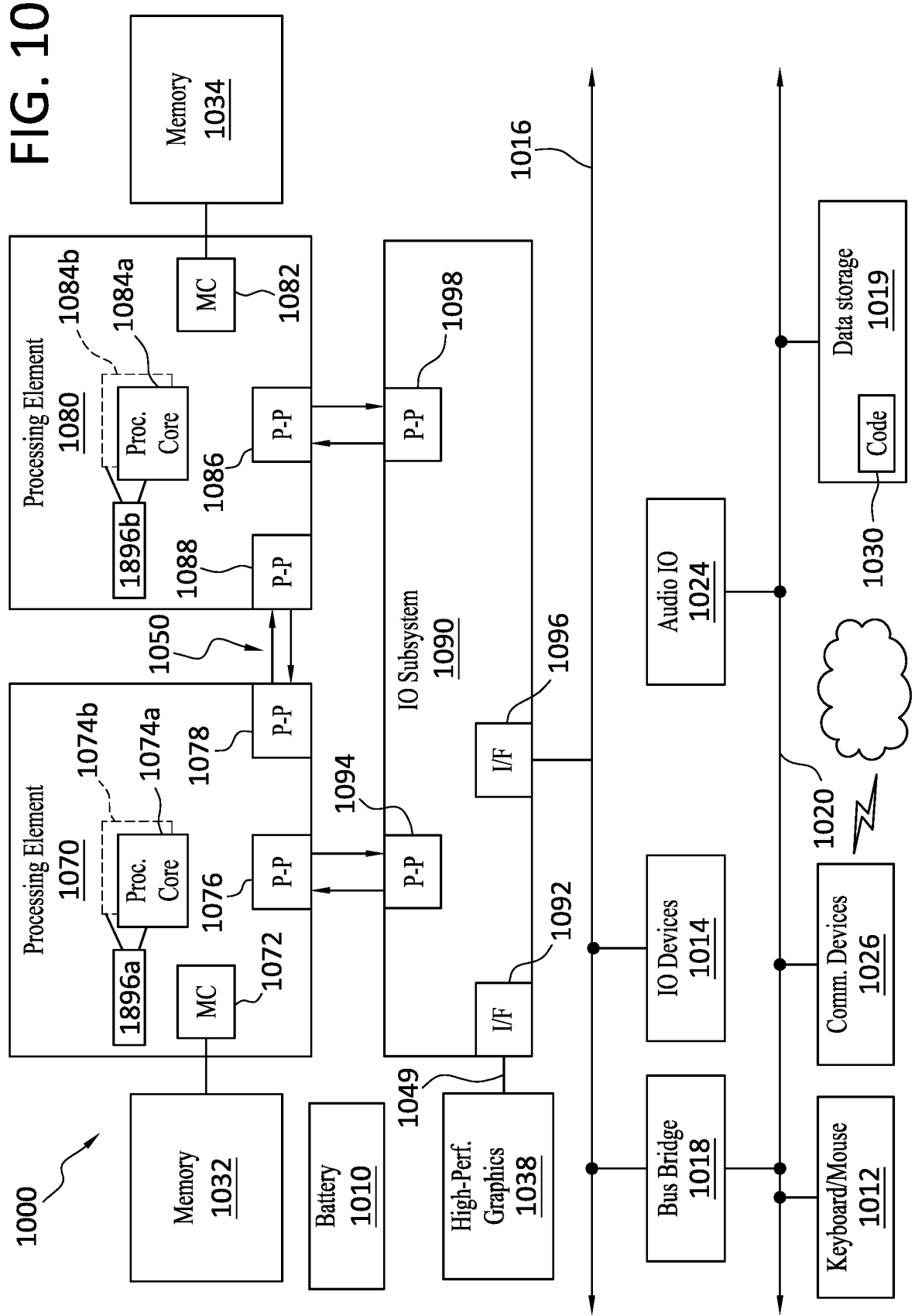

CONTROL SPECULATION IN DATAFLOW GRAPHS

CROSS-REFERENCE TO RELATED APPLICATIONS

The present application claims the benefit of priority to U.S. Non-Provisional patent application Ser. No. 16/456,953 (now U.S. Pat. No. 10,860,301) filed on Jun. 28, 2019.

TECHNICAL FIELD

Embodiments generally relate to the implementation of dataflow architectures. More particularly, embodiments relate to control speculation in dataflow graphs.

BACKGROUND

Dataflow graphs may be used to model computer code in terms of the dependencies between individual operations performed by the code. The dependency information in dataflow graphs may facilitate the identification of operations that can execute in parallel. Certain code, however, may have data or control dependencies that prevent the code from being efficiently executed in parallel. For example, a computational loop typically involves completion of the loop body prior to making a control flow decision (e.g., exit the loop or remain in the loop). In such a case, implementation of the dataflow graph in a computing architecture may expose the architecture to latencies (e.g., if the loop body involves the retrieval of values from memory). Conventional solutions to addressing control dependencies may involve the introduction of complex and costly hardware operations.

BRIEF DESCRIPTION OF THE DRAWINGS

The various advantages of the embodiments will become apparent to one skilled in the art by reading the following specification and appended claims, and by referencing the following drawings, in which:

FIG. 1B is a dataflow graph of an example of a control portion of computer code according to an embodiment;

FIG. 1C is a dataflow graph of an example of a loop portion of computer code according to an embodiment;

FIG. 4 is an illustration of an example of a speculative load operation according to an embodiment;

FIG. 5 is a chart of an example of a relationship between cycles and total loop trips for various levels of control speculation according to an embodiment;

FIG. 10 is a block diagram of an example of a multi-processor based computing system according to an embodiment.

DESCRIPTION OF EMBODIMENTS

Figure 1A:
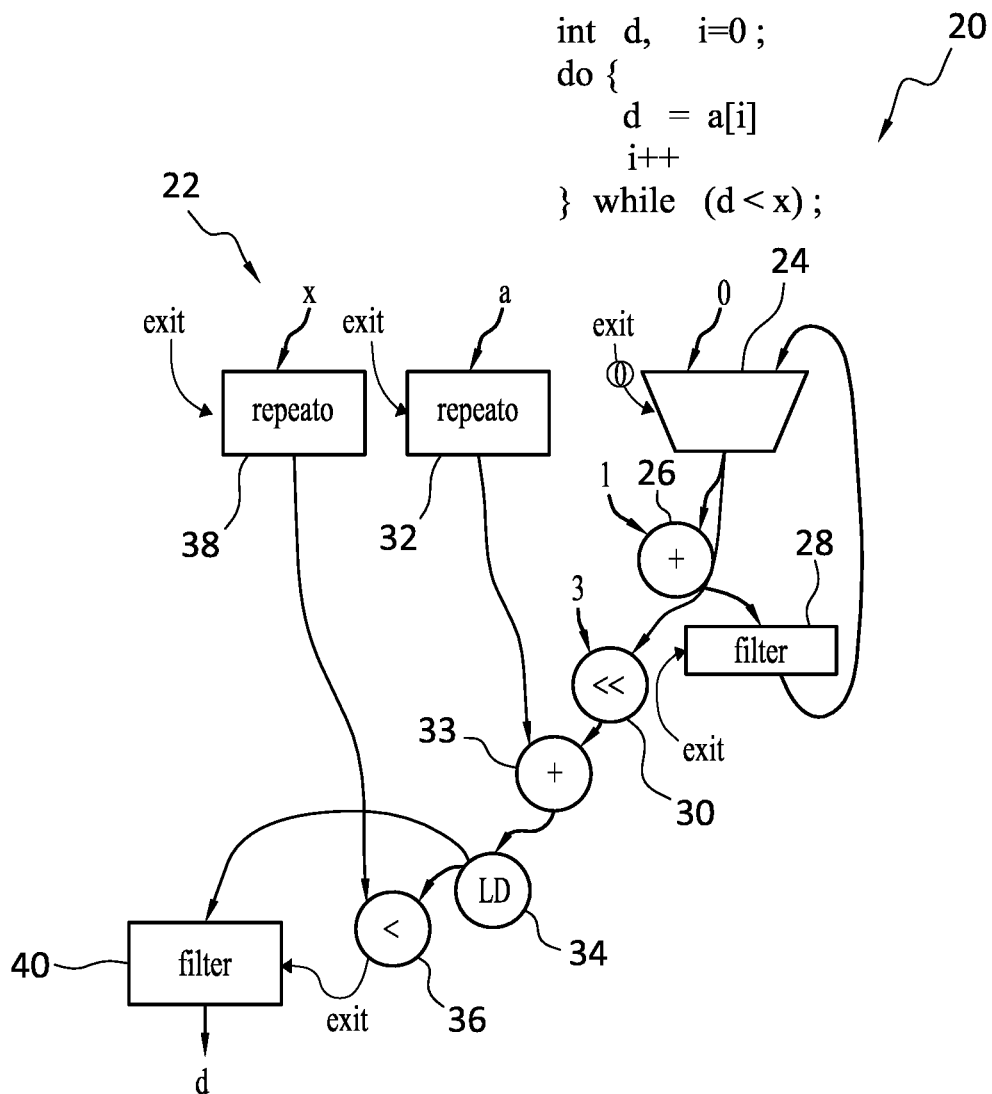
FIG. 1A is an illustration of an example of computer code and a corresponding dataflow graph of a loop portion of the computer code.

Turning now to FIG. 1A, computer code 20 is shown in which a control loop is to be executed for an unspecified number of iterations. More particularly, a loop body (e.g., "d=a[i]") iteratively sets the value of "d" to the elements of an array "a[i]" until the value of d meets or exceeds the value of x. Of particular note is that the execution of the loop body is "controlled" by the comparison of d to x. Moreover, because the elements of a[i] are retrieved from memory, the computer code 20 may result in a critical path having a relatively long latency.

For example, a dataflow graph 22 of the loop portion includes a pick node 24 (e.g., multiplexer) that selects between the initial value of "i" (e.g., zero) and an incremented value of i, which is generated by a summation node 26 and a filter node 28. In the illustrated example, a shift node 30 (e.g., shift by three bits, or add eight) selects the address of the next element in the array a[i], as an offset from the base address of a[i] provided by a repeat node 32 and a summation node 33. A load node 34 may load the value from the selected address, where a compare node 36 compares the loaded value to the value of x, which is provided by a repeat node 38. Because the value of x is unknown, the computer code 20 will be executed for an unspecified number of iterations. Once the value of d meets or exceeds the value of x, the graph 22 may output the value of d via a filter node 40. In such a case, the compare node 36 generates an "exit" signal that is input to the filter node 40, the filter node 28, the pick node 24, the repeat node 32 and the repeat node 38. In the illustrated example, the pick node 24, the filter node 28, the shift node 30, the summation node 33, the load node 34 and the compare node 36 represent a relatively long critical path that may limit performance if execution of the computer code 20 is serialized and/or pipelined.

As will be discussed in greater detail, the computer code 20 may be forced to speculatively execute for a fixed number of iterations in addition to the unspecified number of iterations, where execution of the computer code 20 is conducted in parallel. Such an approach enables the performance impact of the length of the critical path to be significantly reduced. Moreover, a selective removal of dataflow tokens associated with the speculative execution enables the performance advantages to be achieved without the use of additional hardware.

For example, loops typically execute for a statically unknowable number of "trips", which may be zero. The technology described herein creates control structures that force a loop to always execute for a fixed number of iterations (referred to as "spec", which may be chosen dynamically for each complete loop execution) in addition to the number of iterations dictated by the actual control flow of the program. In an embodiment, these iterations can be thought of as speculative in the sense that they do not actually occur. Because each loop is known to execute for "spec" iterations, however, this number of iterations may always be executed in parallel by the dataflow graph, up to the limit of true data dependencies, which results in a substantial performance increase over serialized execution.

FIGS. 1B and 1C show a control portion 50 and a loop portion 52 of a dataflow graph in which speculative execution of the control portion 50 is achieved. Some additional dataflow operations and control sequences are defined to enable this speculation. The first implementation difference is generating a control stream to force "spec" loop iterations to enter the loop portion 52. This control stream involves generating a modified loop entry control (e.g., "Enter'" signal), which prepends "spec" 1 values in front of the actual loop control (e.g., "exit" signal). The speculation solution may imply that speculated loops will always run "spec" iterations past their natural completion. Thus, some cleanup logic is introduced to remove dataflow tokens resulting from the non-existent executions. In an embodiment, the cleanup logic conducts a series of filter operations at the bottom of the loop portion 52, which remove the last "spec" tokens in the loop execution, as determined by the generated exit signal (e.g., "Exit'" signal). Speculative memory operations may be handled in a slightly different manner, as will be discussed in greater detail.

The proposed speculative loop transform therefore improves the throughput of otherwise serial loops. Such acceleration clearly comes when a particular speculated loop has a trip count that is relatively large (e.g., greater than, say two). The transform may have some overhead, however, in that the cleanup phase of execution may partially block a new loop from executing. In an embodiment, the number of cycles lost is bounded at the number of speculative contexts injected into the loop. For loops with moderate speculation (e.g., "spec"=8) and a load (e.g., 60 cycles of latency), the actual overhead in practice is relatively small even if the loop executes only once. In the case of the computer code 20 (FIG. 1A), this overhead is perhaps 13%. For other cases (e.g., no trips or trips >2) performance may be equal to or greater than the baseline implementation. In an embodiment, the dataflow operations shown FIGS. 1B and 1C, with the exception of the speculative load (LDS) operation, involve no microarchitectural changes.

In the illustrated example, a fixed number of iterations (e.g., "spec+1") is input to a sequencer node 54 that outputs a "last" value (e.g., edge), an iterate value (e.g., "iter") and an inverted last (e.g., "~last" or not last) value. A first stream pick node 56 generates an "Enter'" signal to begin control generation, where the illustrated Enter' signal is input to the stream pick node 24, the repeat node 32, the repeat node 38 and the filter node 28 in the loop portion 52. The sequencer node 54 may generate dataflow tokens via the last value, the iterate value and the inverted last value. Once the code has executed for the fixed number of iterations, a second stream pick node 58 may remove the dataflow tokens via an "Exit'" signal, which is input to a set of cleanup filter nodes 60 (60a-60c) in the loop portion 52.

Additionally, a speculative load (LDS) node 64 may notify an error node 62 of anomalies such as, for example, a translation lookaside buffer (TLB) miss, an access to an input/output (TO) memory address, an access to a virtual memory address (e.g., triggering a protection violation) and/or other non-cacheable memory mode anomaly. In such a case, a message may be sent to software using existing fabric mechanisms. In an embodiment, a compiler injects code to handle this message by signaling a runtime error to the user program. In this manner, a reasonable programming model may be achieved under speculation without the introduction of complex new hardware. Because each loop executes for "spec" iterations, this number of iterations can always be executed in parallel by the dataflow graph, up to the limit of true data dependencies, which results in a substantial performance increase over serialized execution.

Figure 2A:
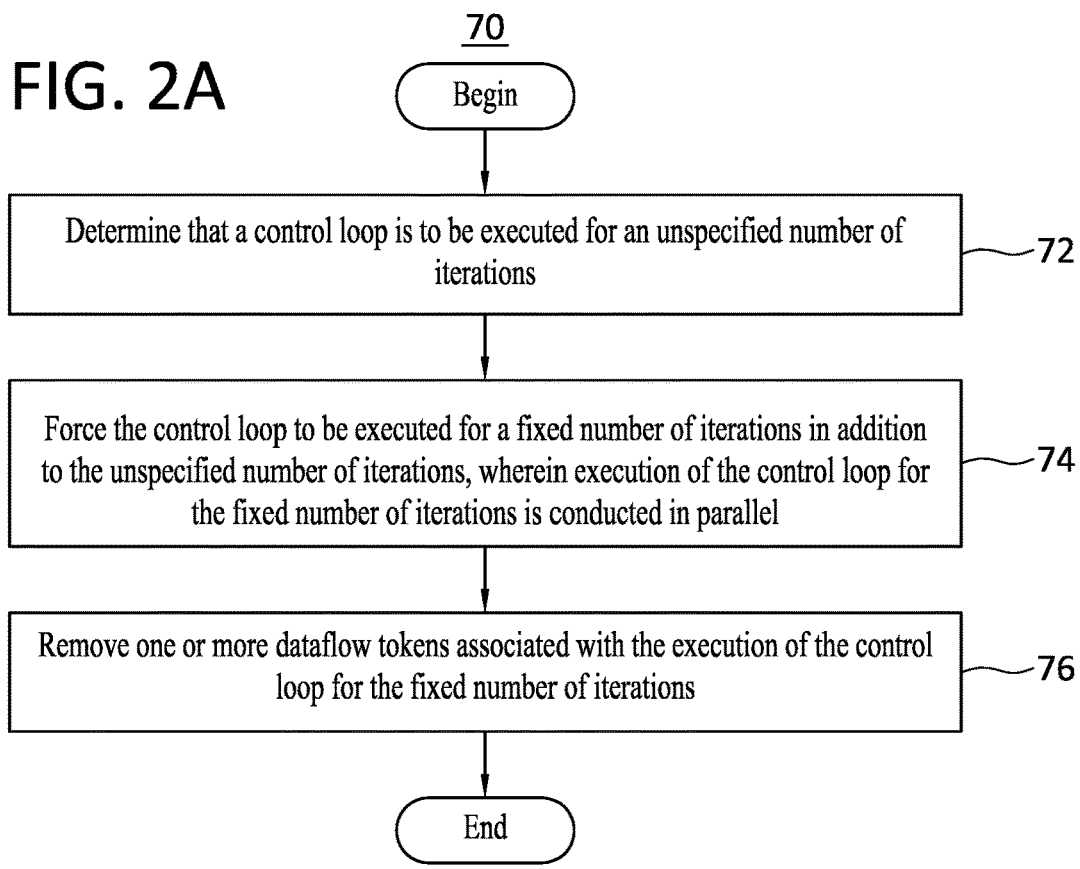
FIGS. 2A-2B are flowcharts of examples of methods of operating a performance-enhanced computing system according to embodiments.

FIG. 2A shows a method 70 of operating a performance-enhanced computing system. The method 70 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 70 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 72 determines that a control loop is to be executed for an unspecified number of iterations. Block 74 forces the control loop to be executed for a fixed number of iterations in addition to the unspecified number of iterations, wherein execution of the control loop for the fixed number of iterations is conducted in parallel. Additionally, block 76 may remove one or more dataflow tokens associated with the execution of the control loop for the fixed number of iterations. Forcing the control loop to speculatively execute for a fixed number of iterations in addition to the unspecified number of iterations, enables the performance impact of the length of the critical path to be significantly reduced. Moreover, the selective removal of dataflow tokens associated with the speculative execution enables the performance advantages to be achieved without the use of additional hardware.

Figure 2B:
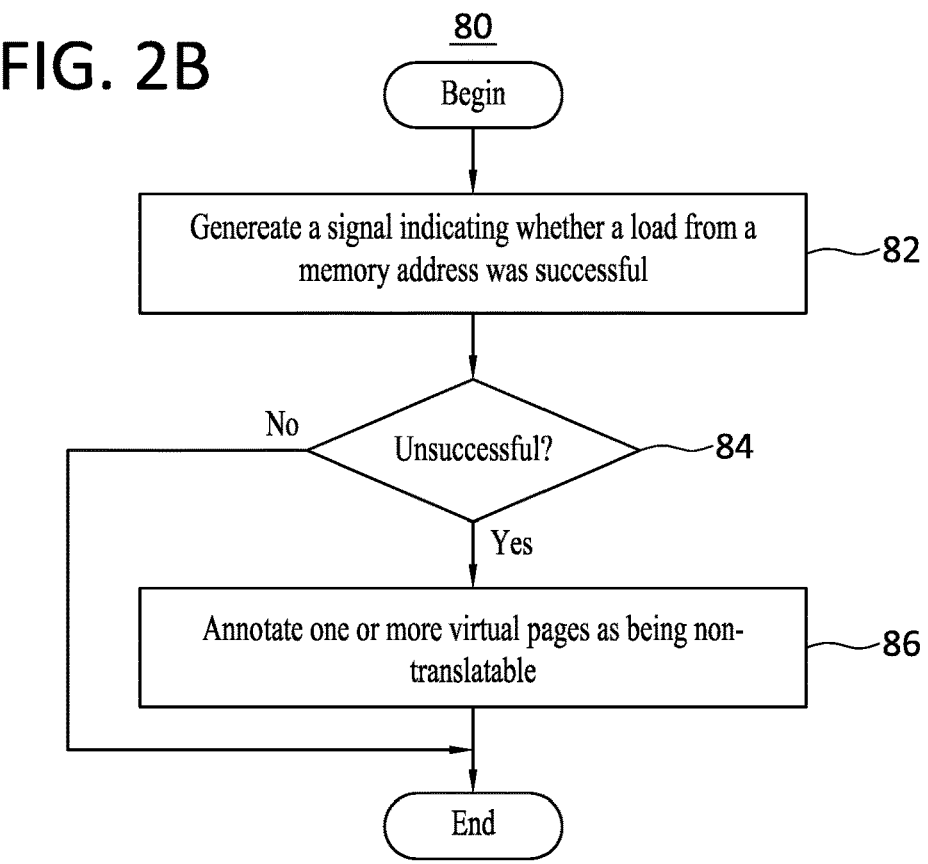

FIG. 2B shows another method 80 of operating a performance-enhanced computing system. The method 80 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 82 generates a signal that indicates whether a control loop load from a memory address was successful. If it is determined at block 84 that the load was unsuccessful (e.g. due to the load being an access to an IO memory address, the load being an access to a virtual memory address that triggers a protection violation and/or another non-cacheable memory mode anomaly), block 86 may annotate one or more virtual pages as being non-translatable. If the load was successful, the illustrated method 80 bypasses block 86 and terminates. The illustrated method 80 therefore enables control speculation to work well in a wide variety of use cases.

Figure 3A:
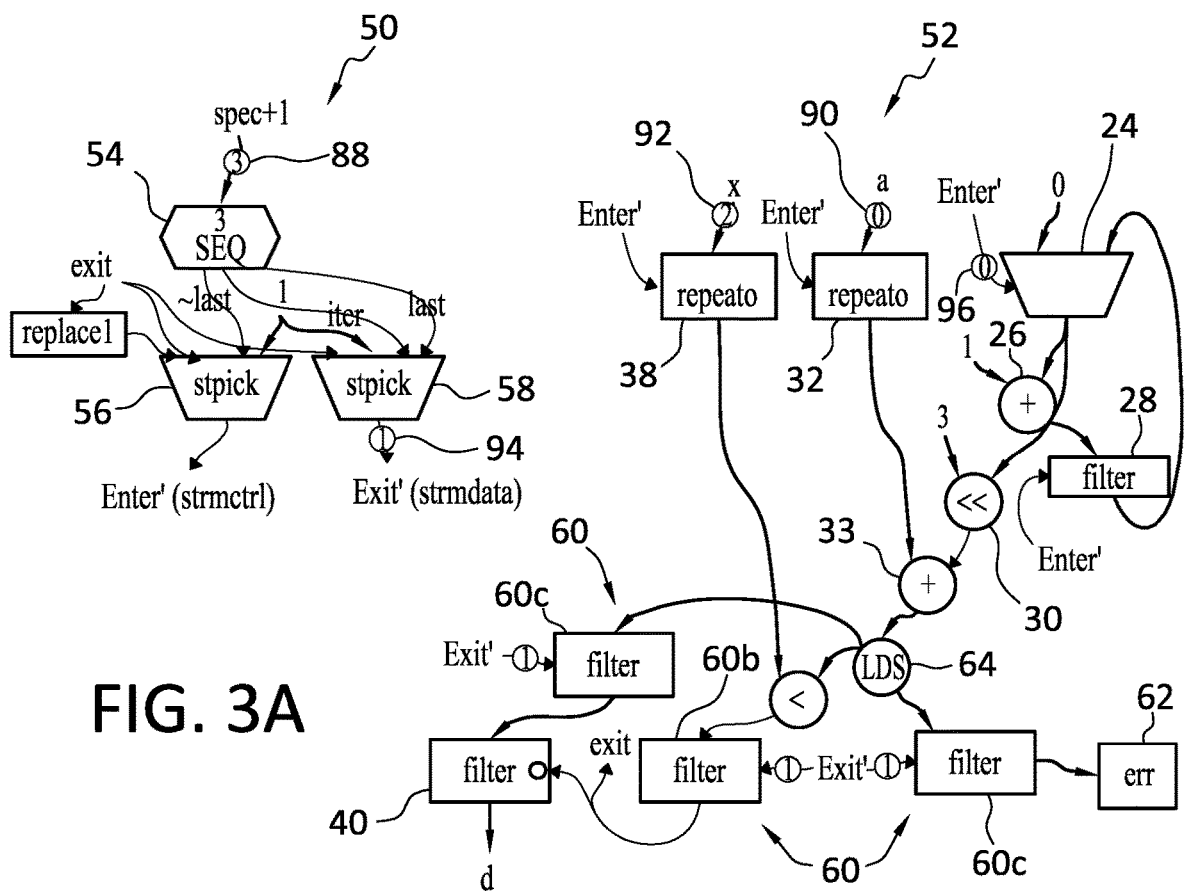
FIGS. 3A-3X are dataflow graphs of an example of a sequential operation of computer code according to an embodiment.
Figure 3B:
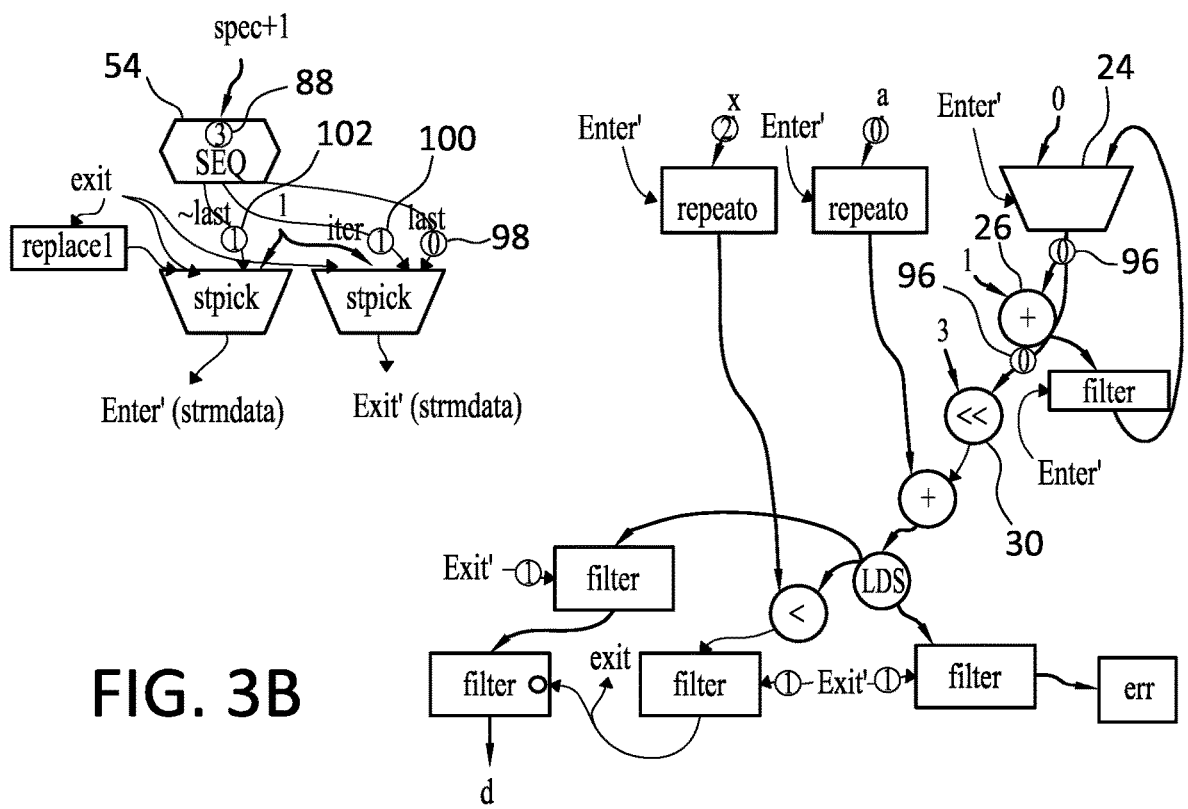
Figures 3C, 3D:
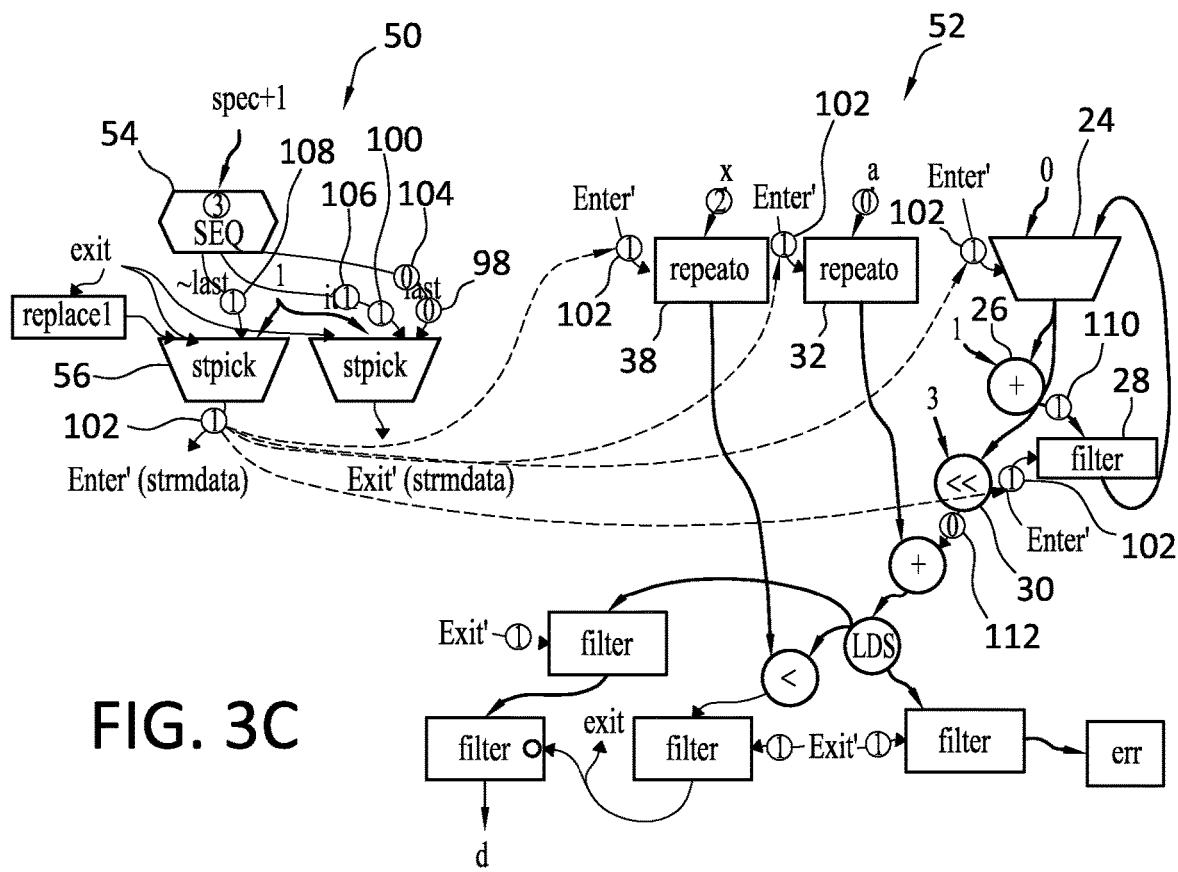
Figure 3E:
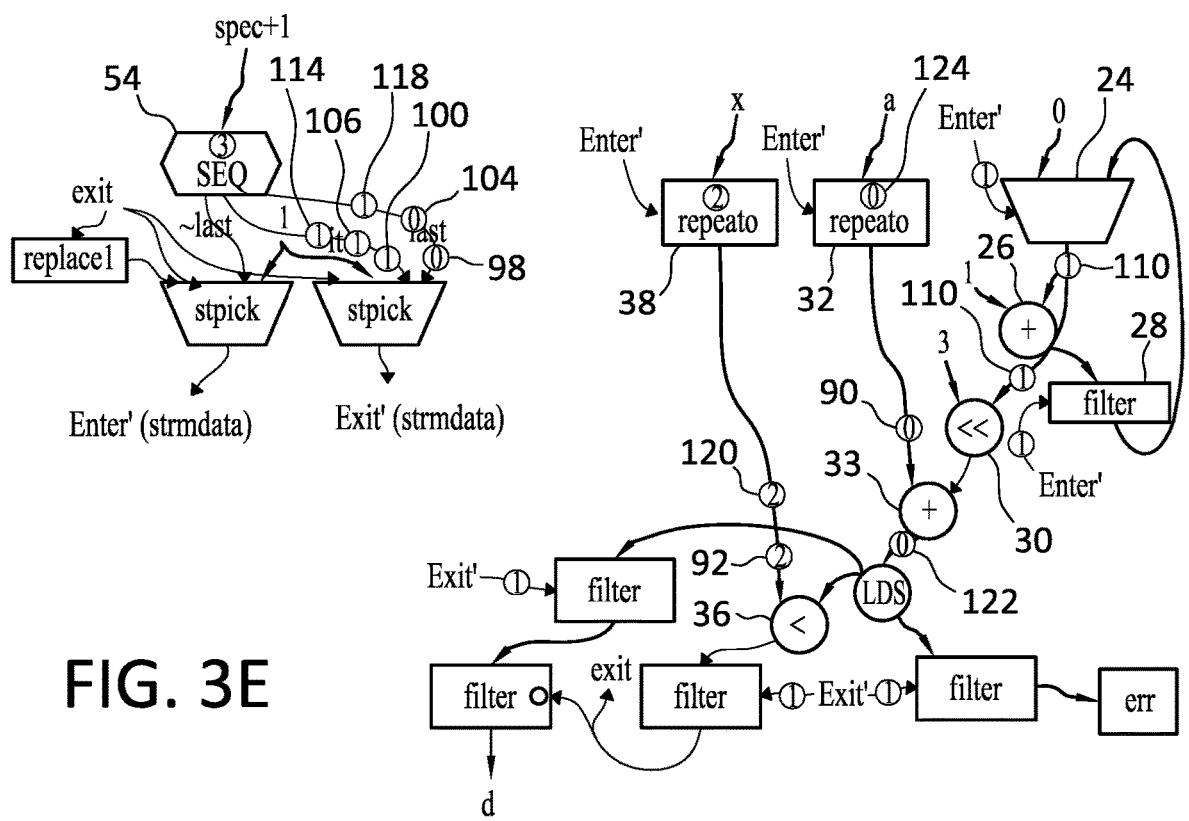
Figure 3F:
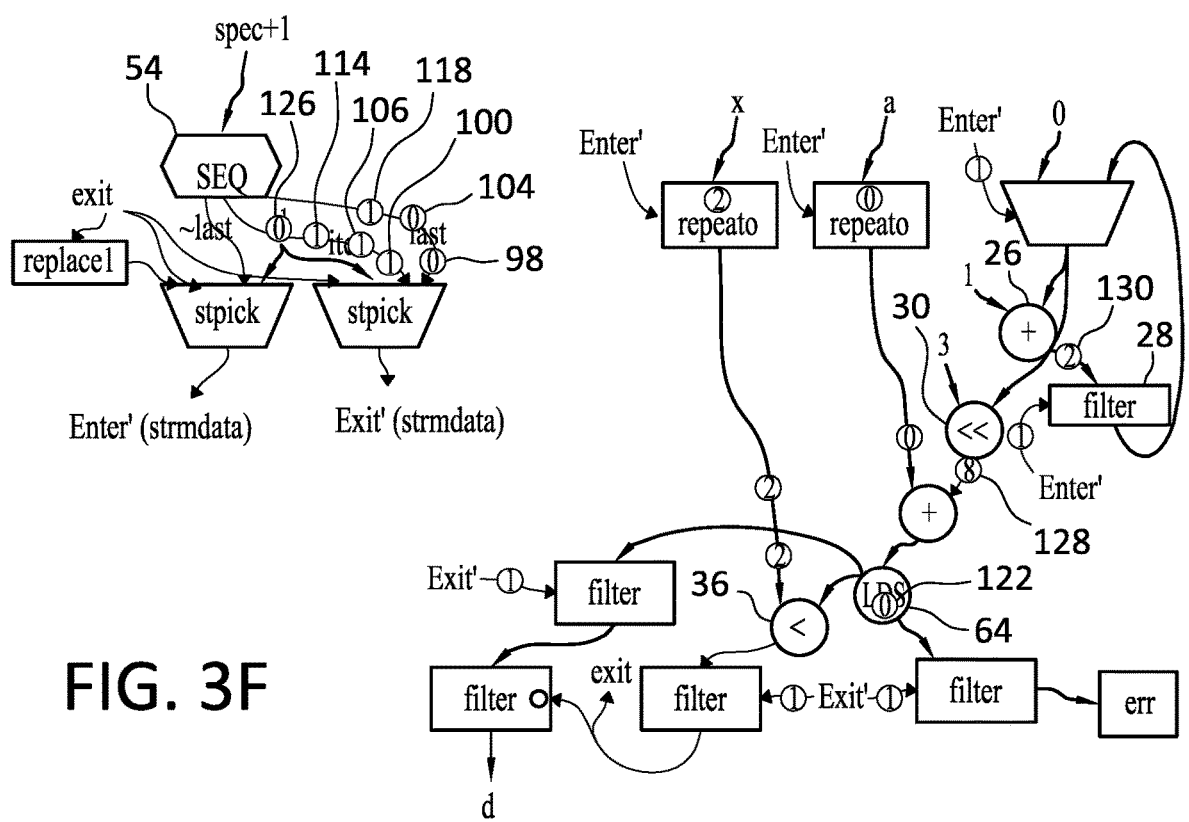
Figure 3G:
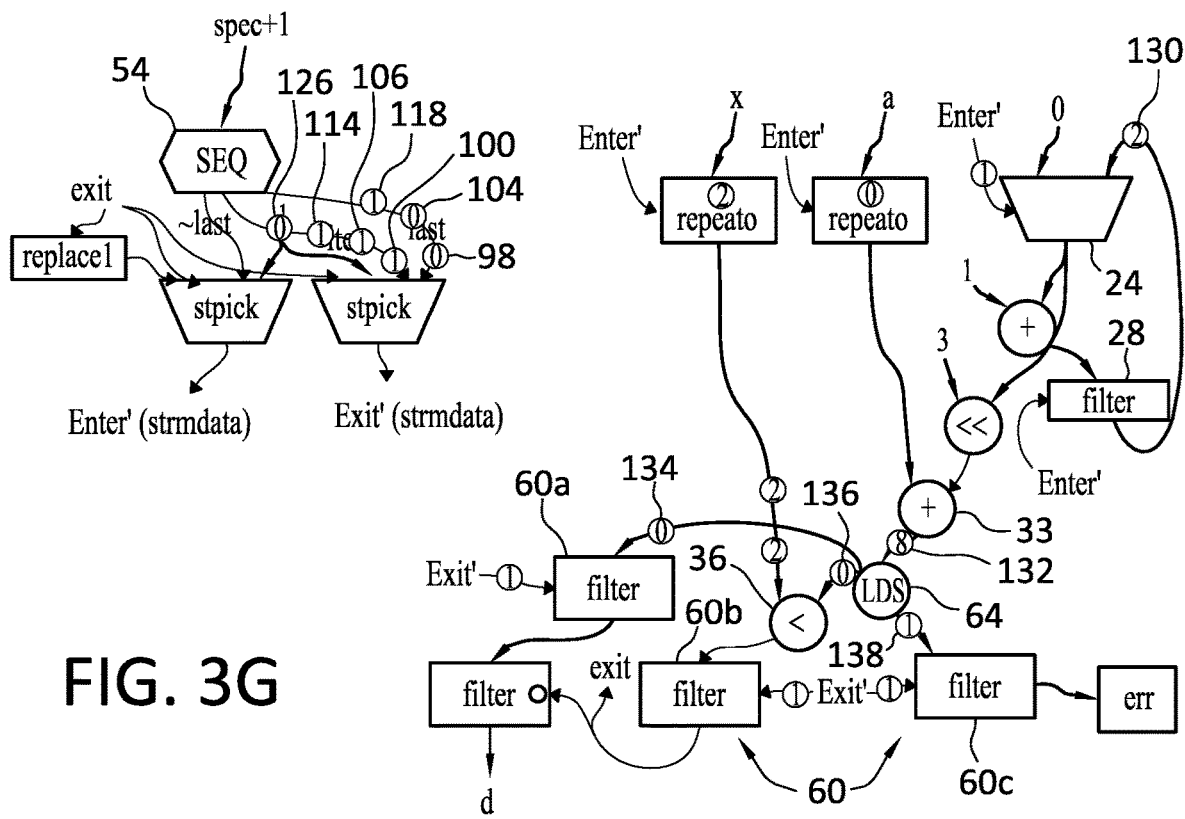
Figure 3H:
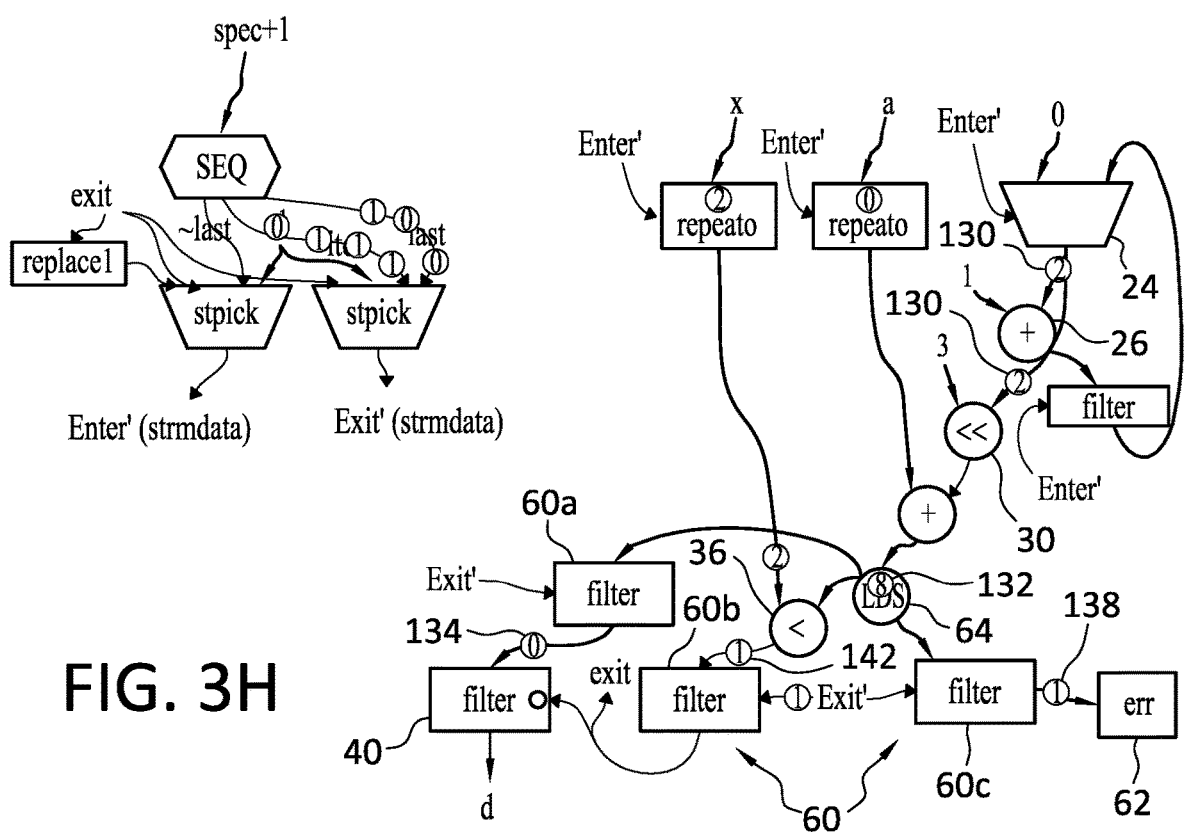
Figure 3I:
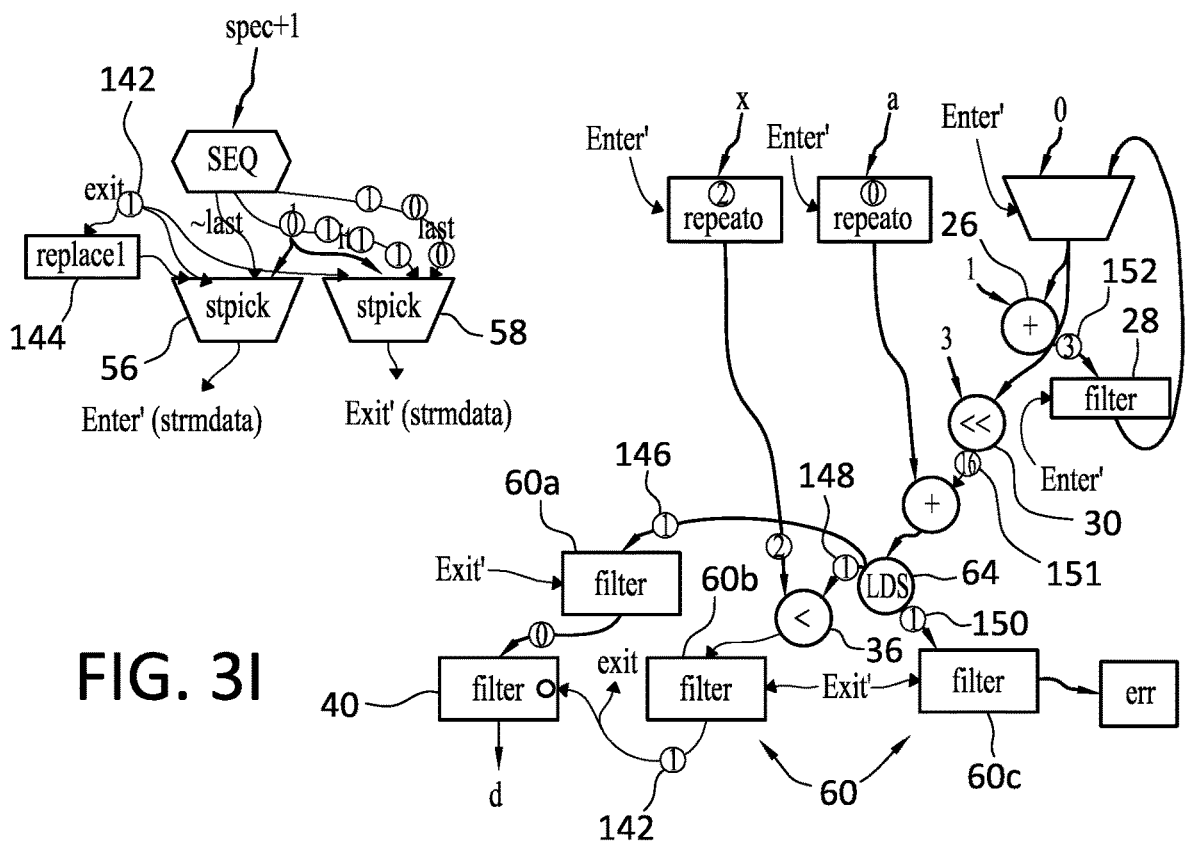
Figure 3J:
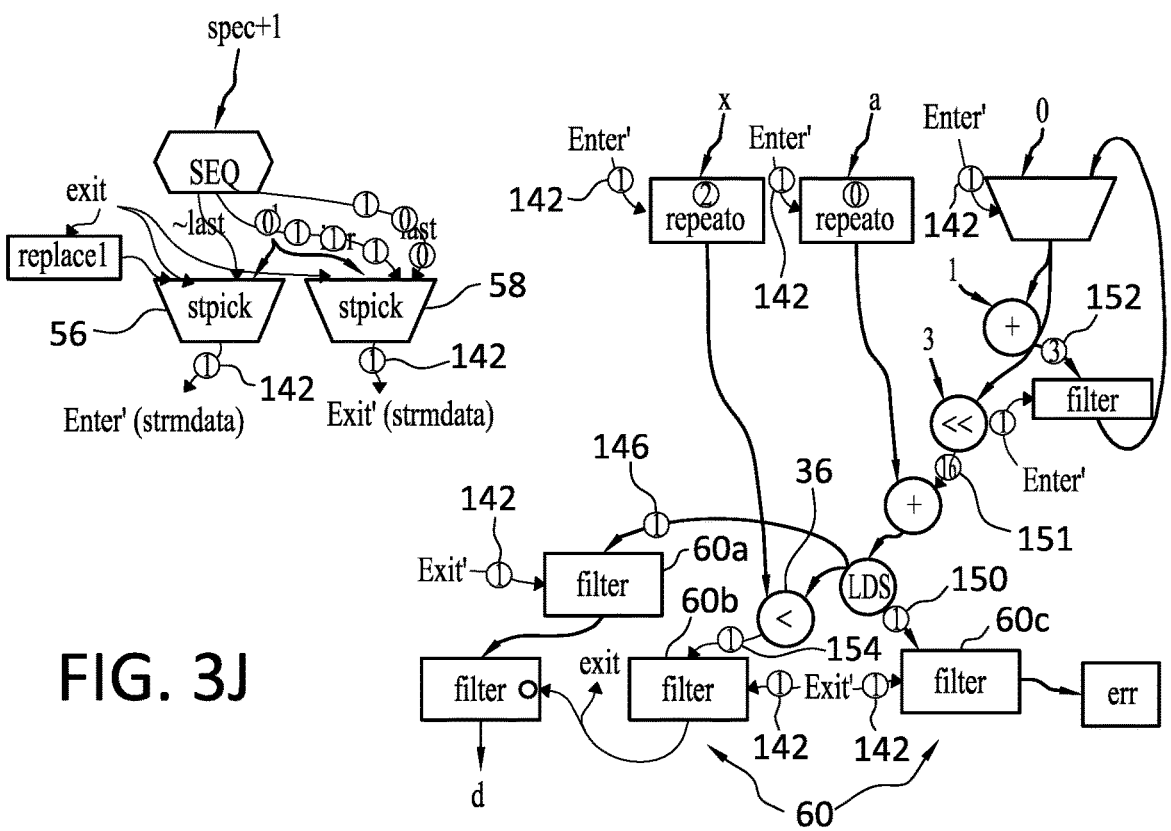
Figure 3K:
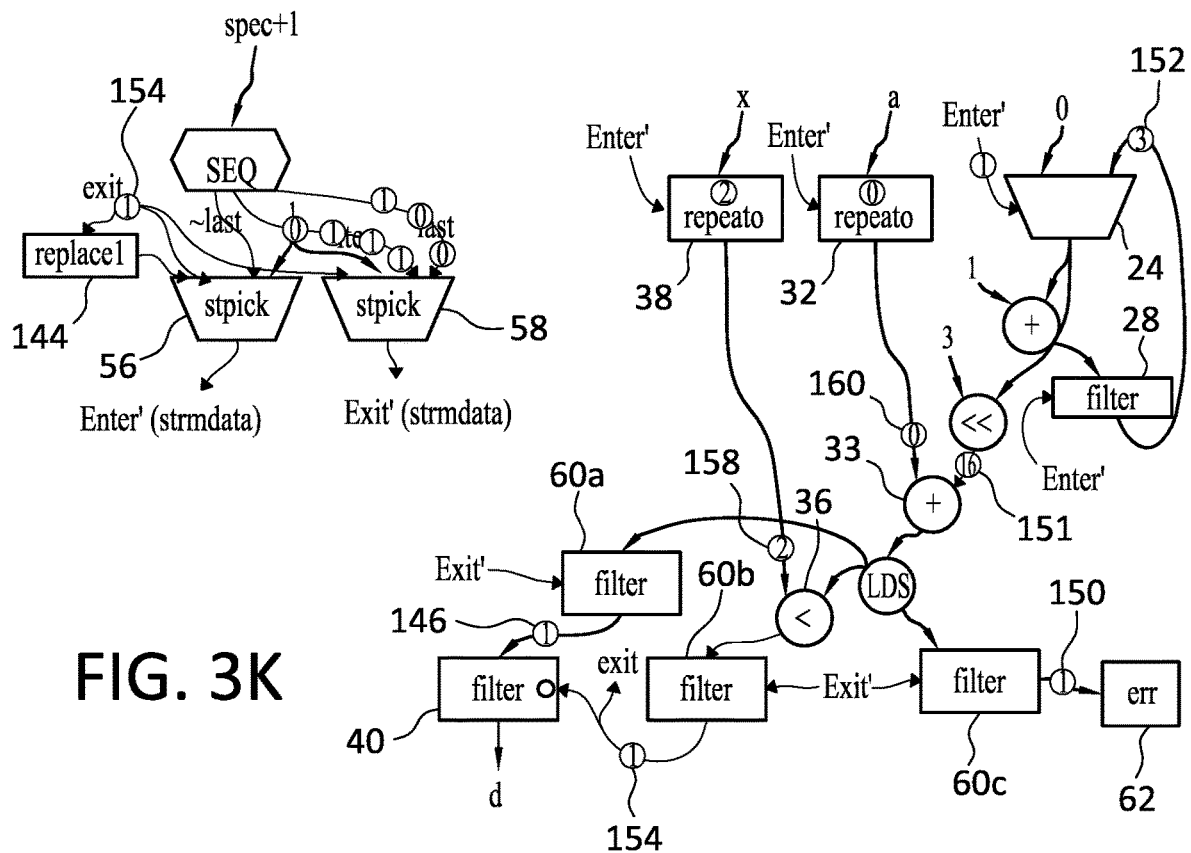
Figure 3L:
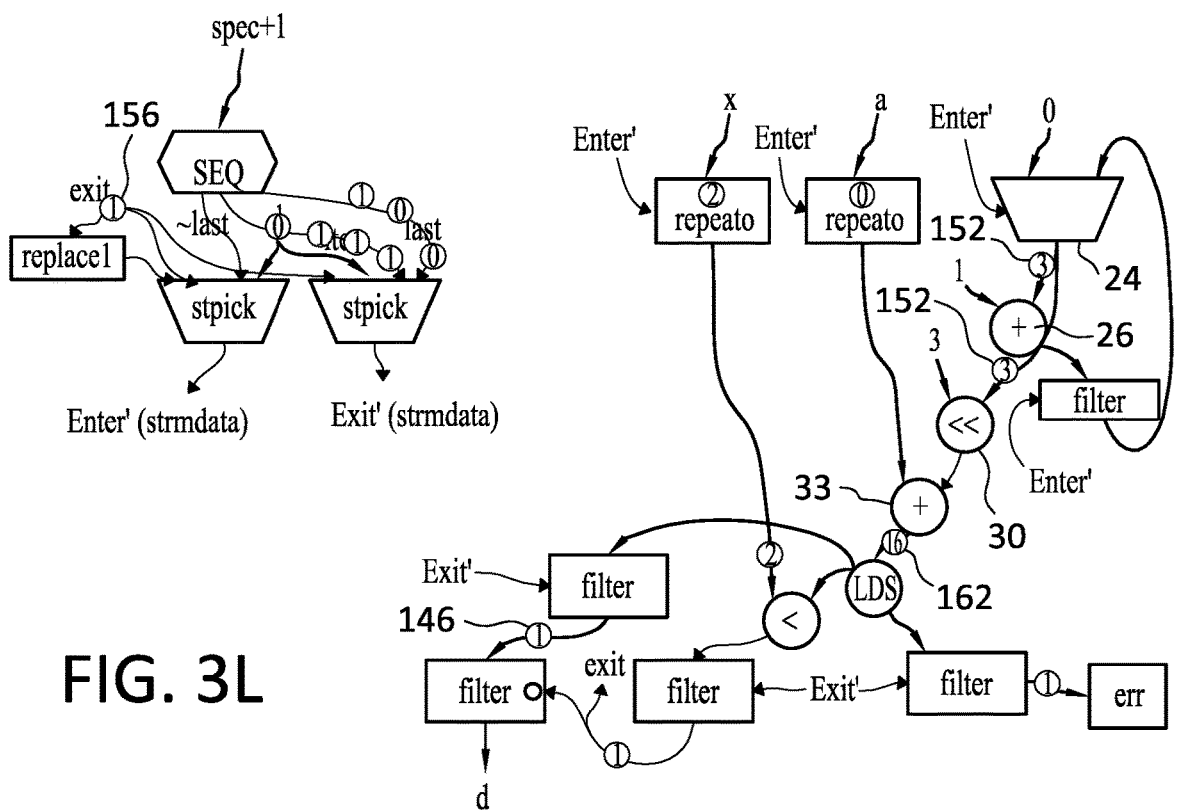
Figure 3M:
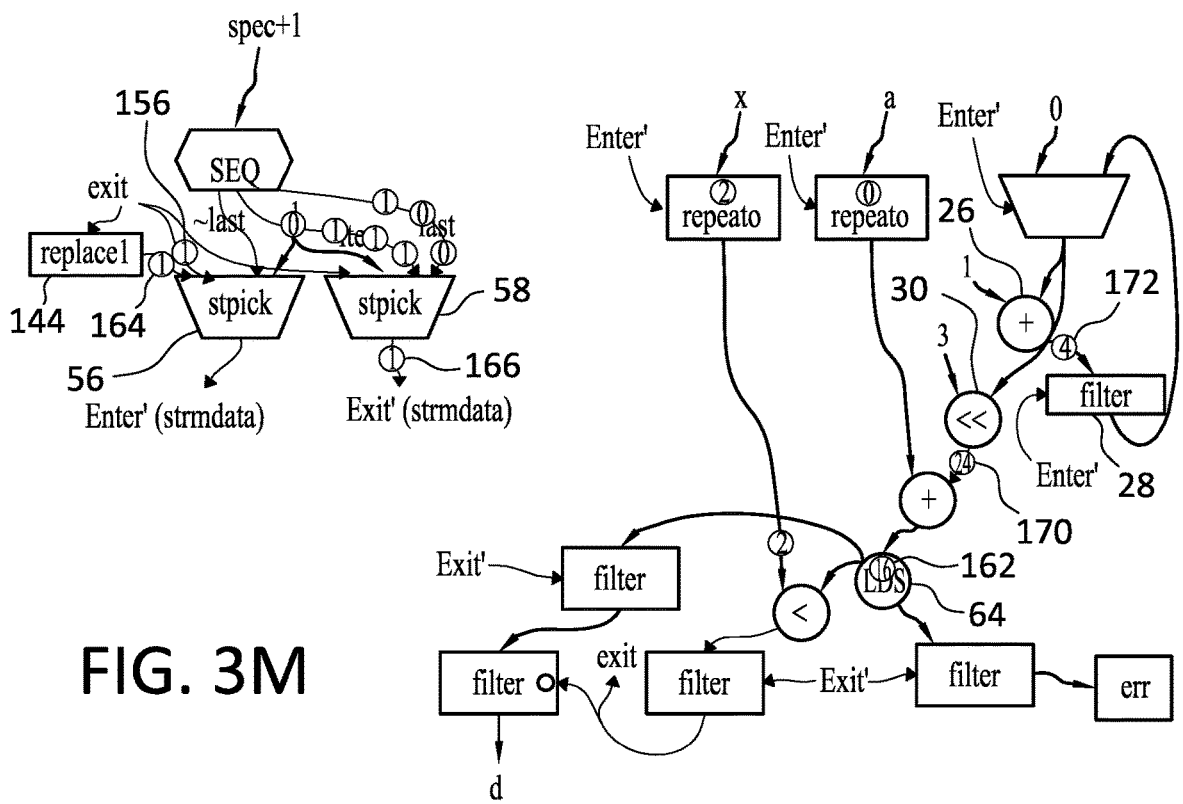
Figure 3N:
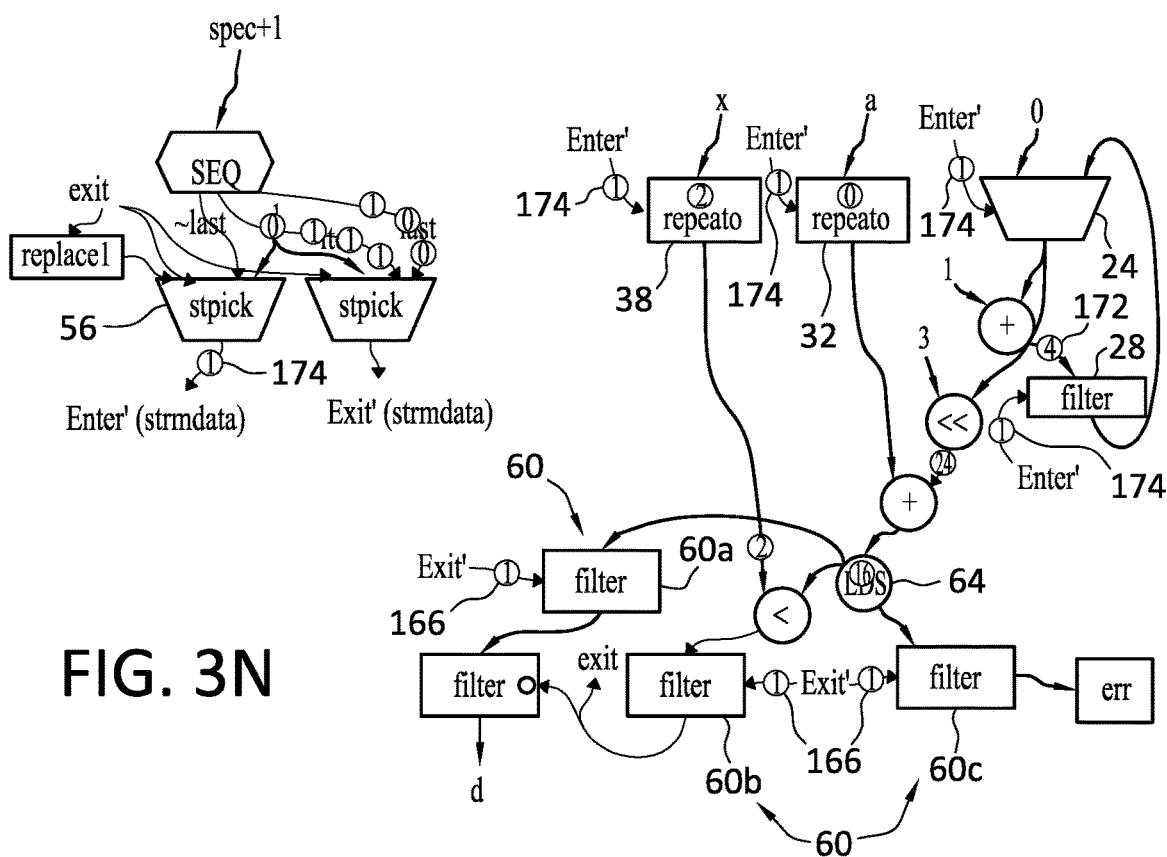
Figure 3O:
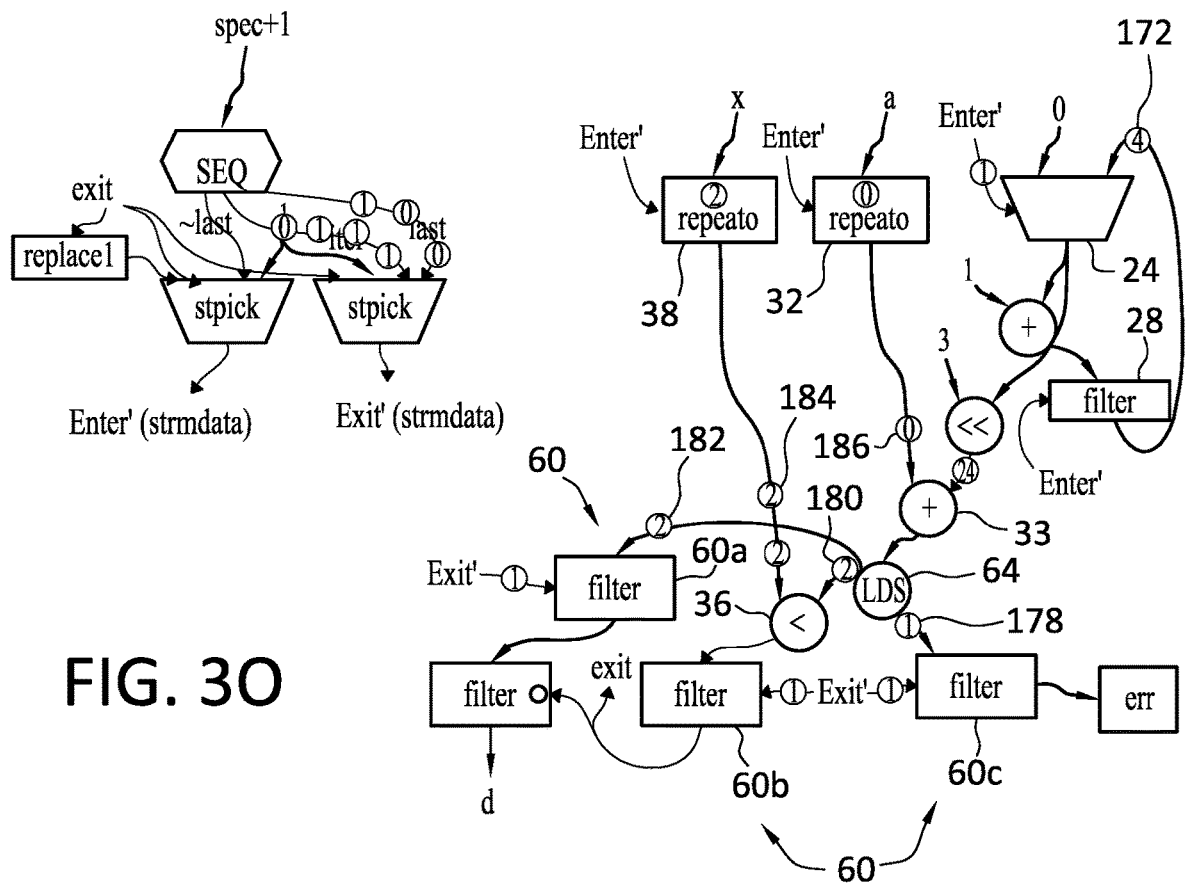
Figure 3P:
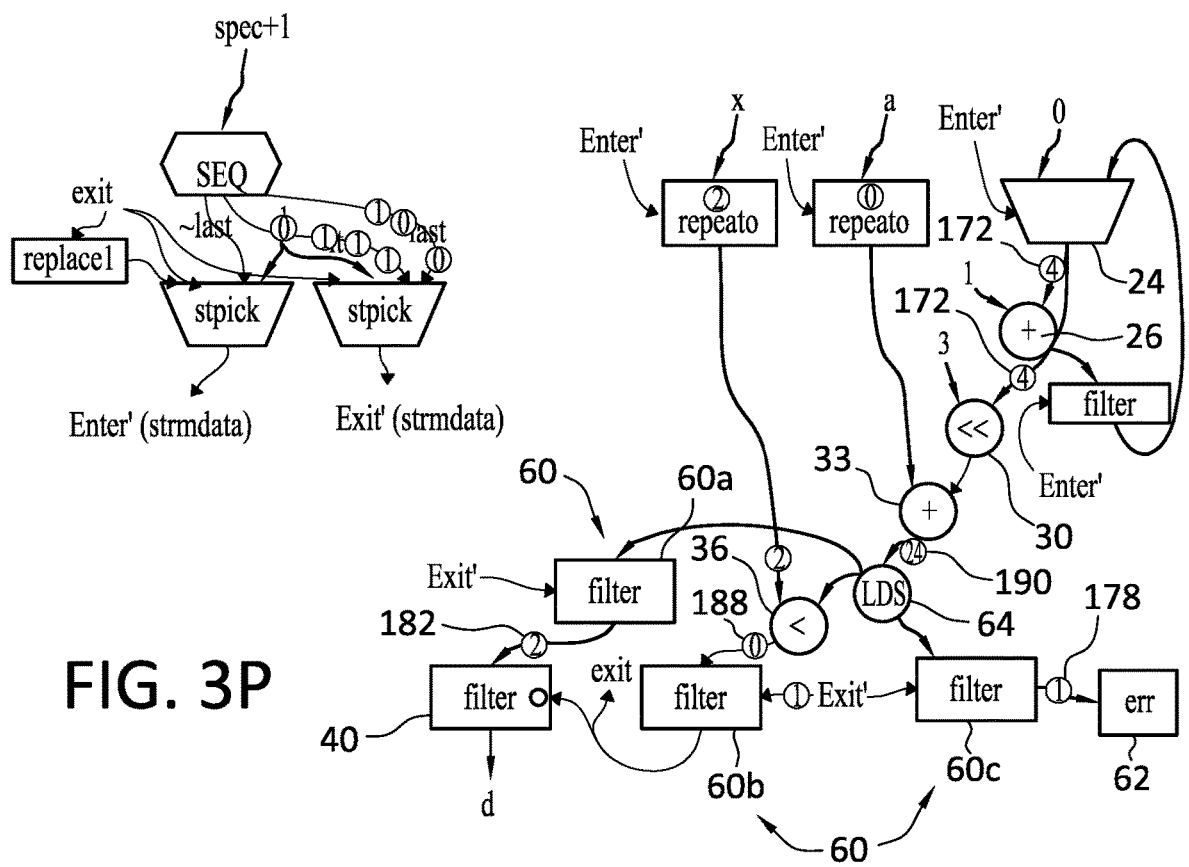
Figure 3Q:
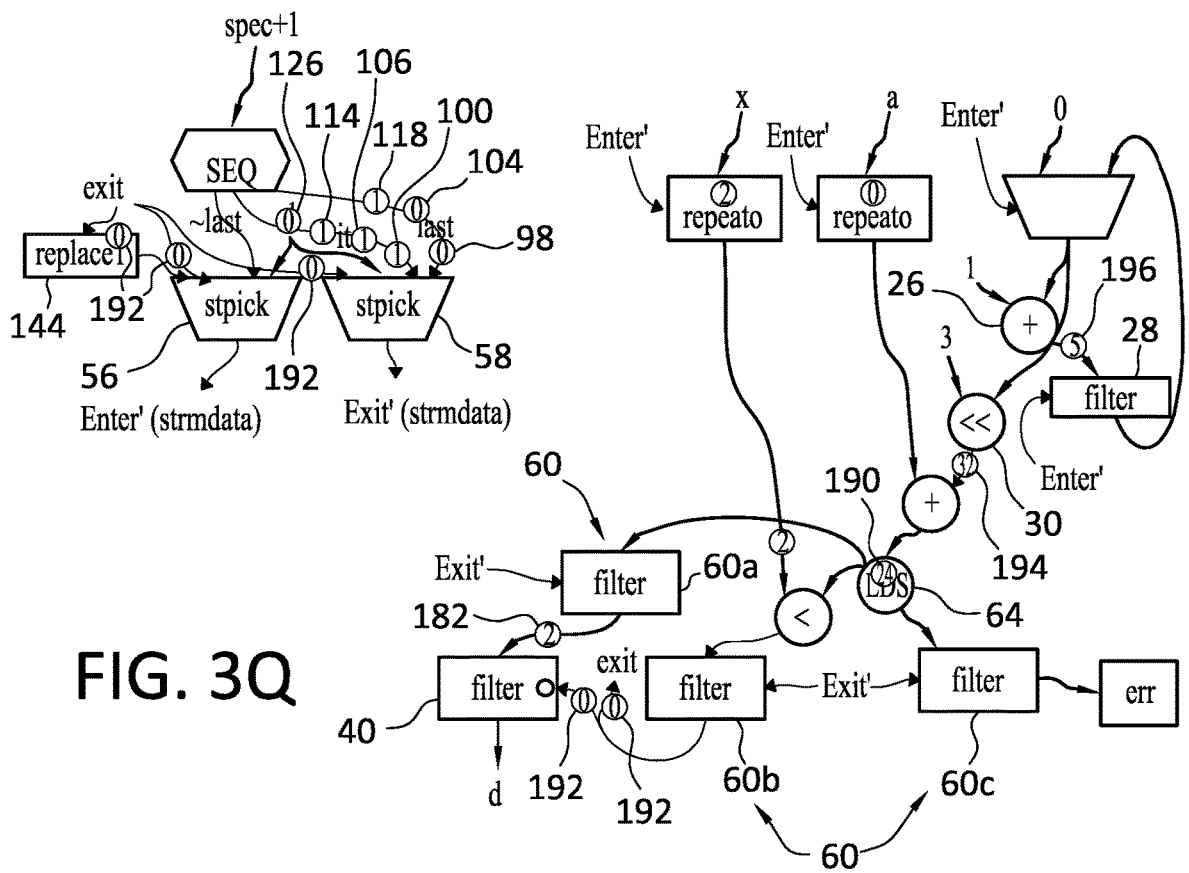
Figure 3R:
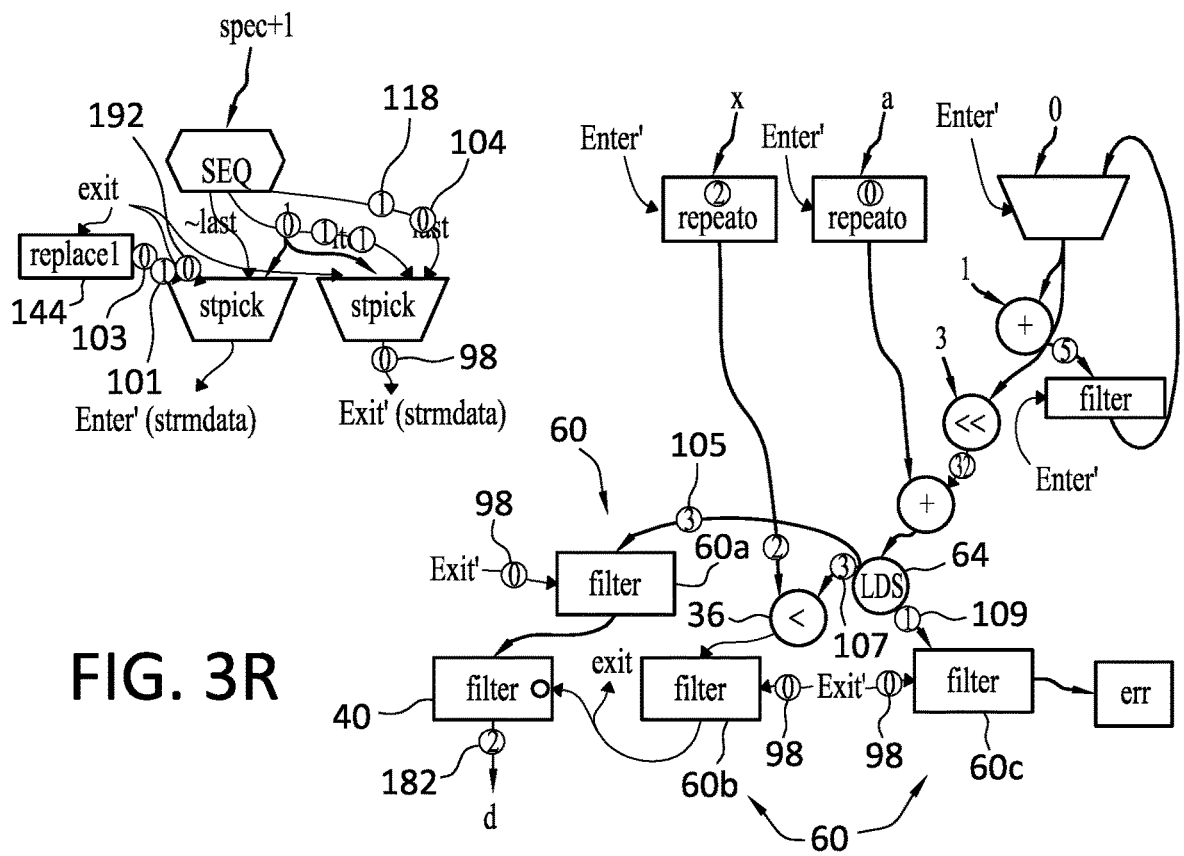
Figure 3S:
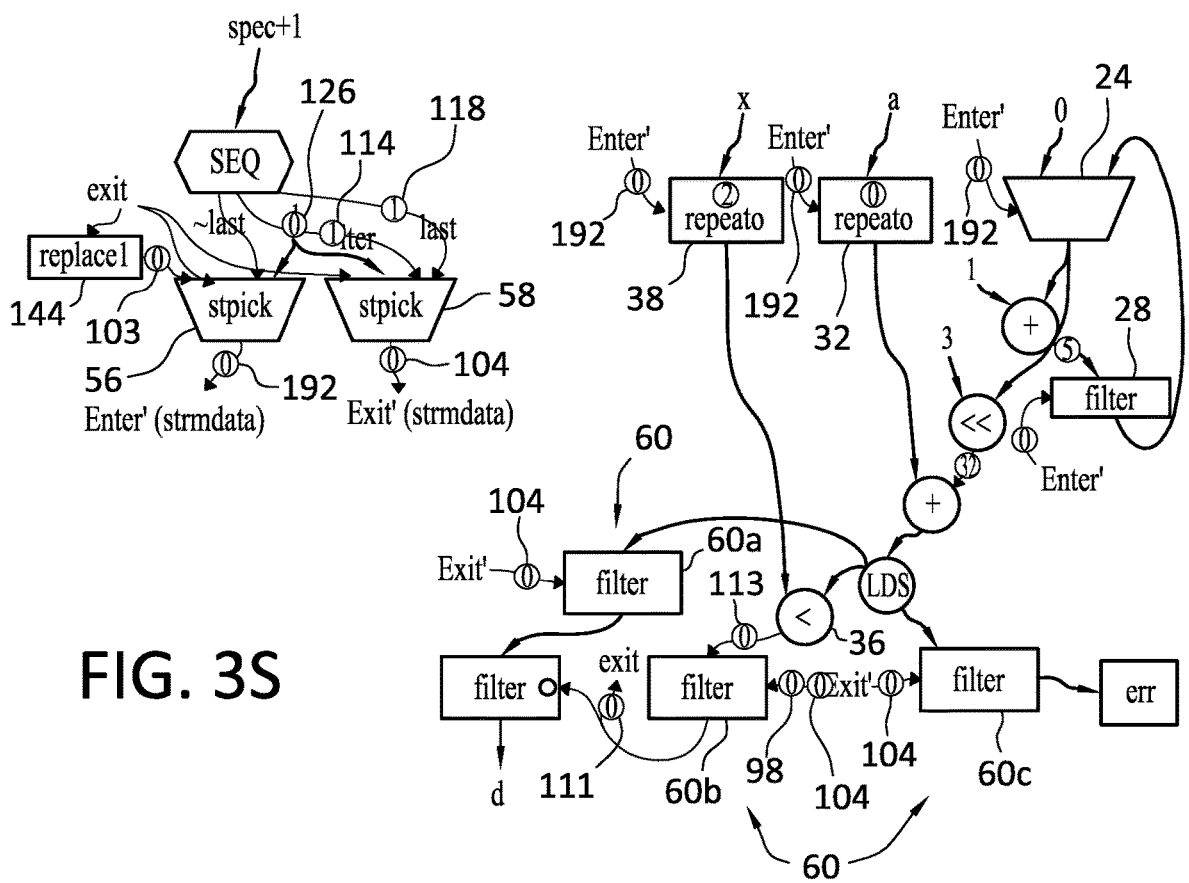
Figure 3T:
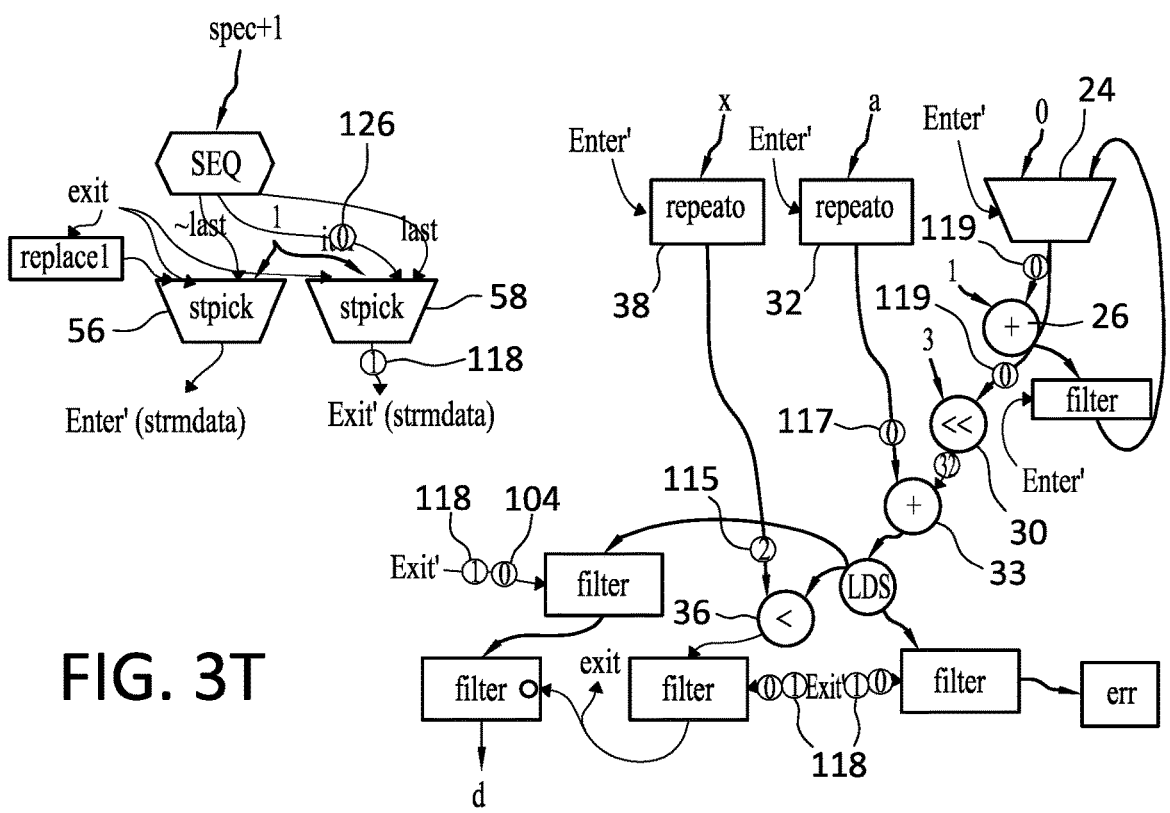
Figure 3U:
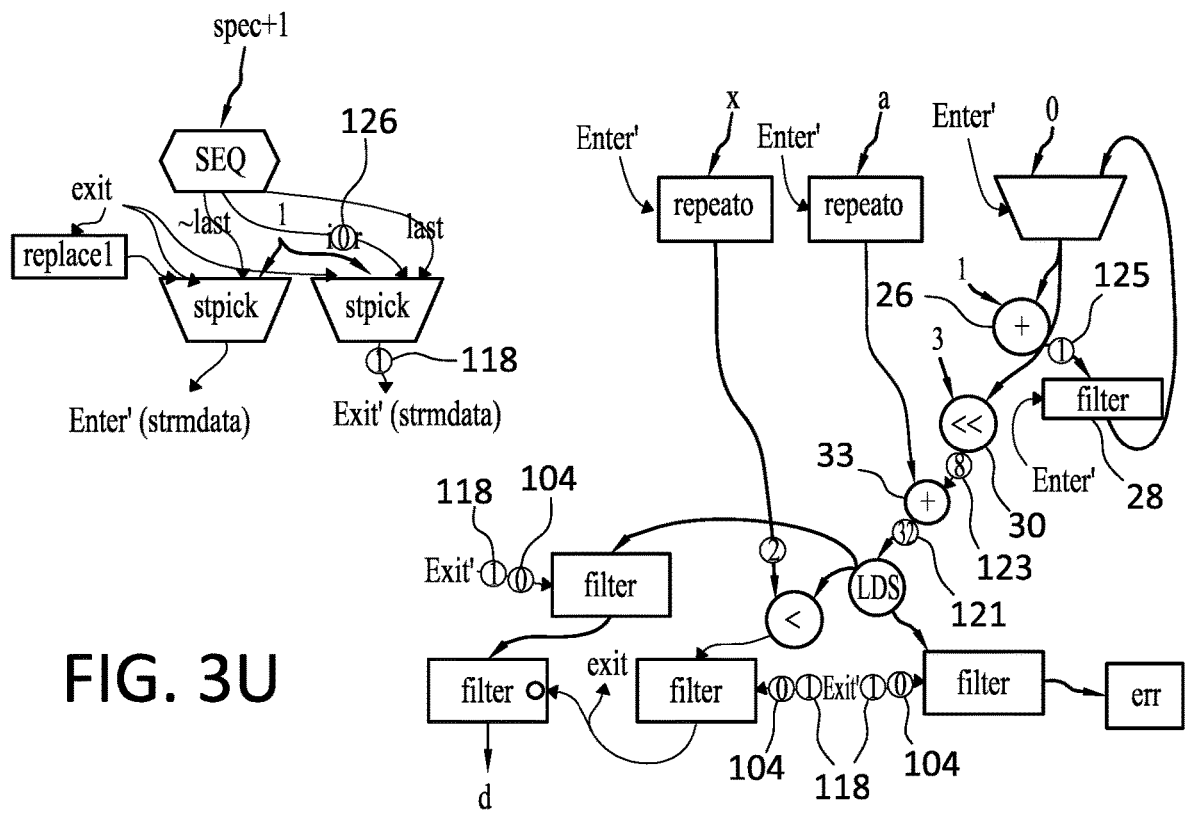
Figure 3V:
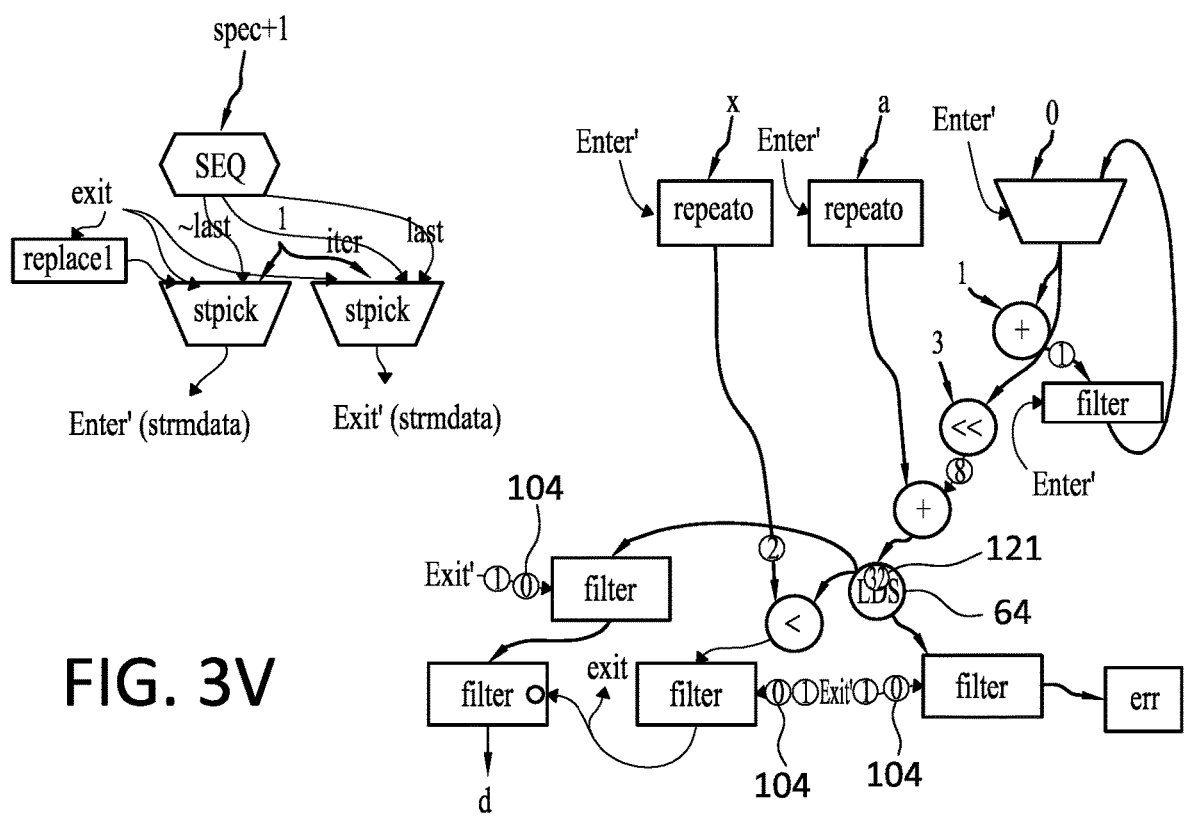
Figure 3W:
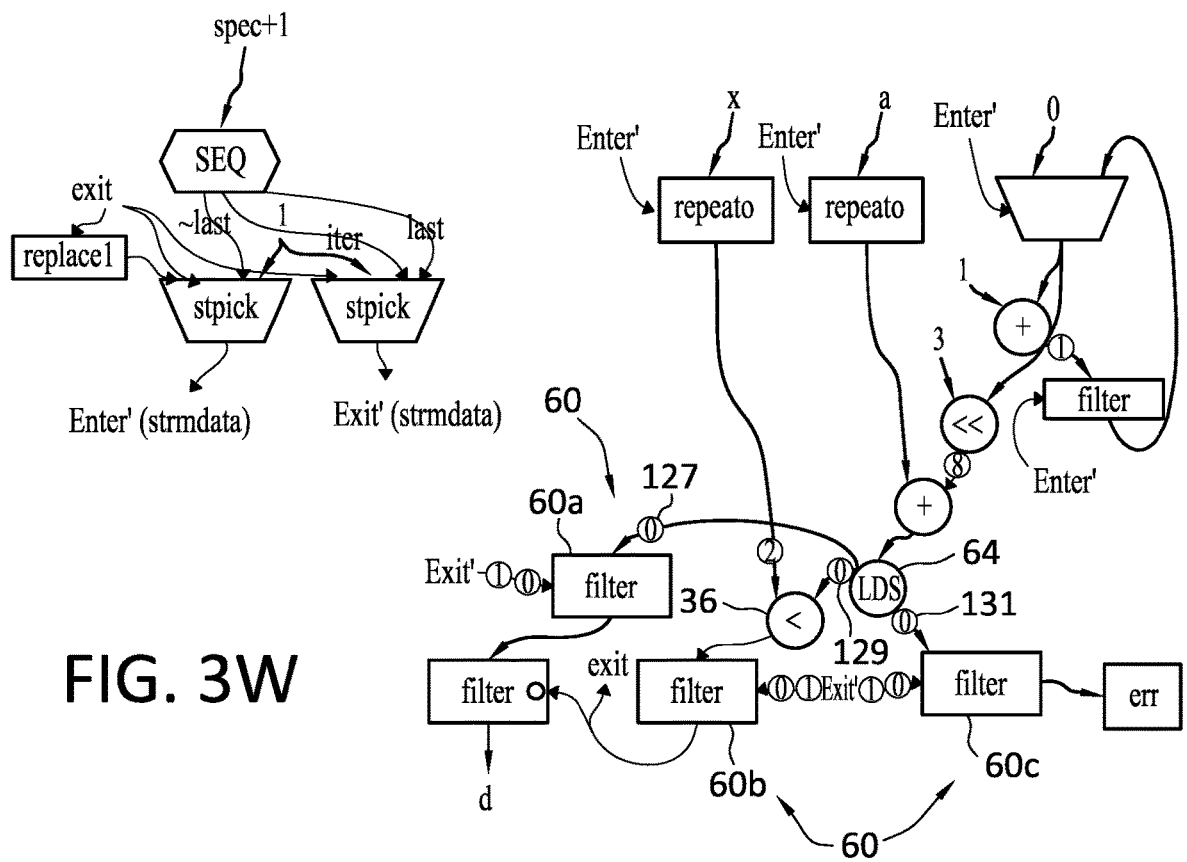
Figure 3X:
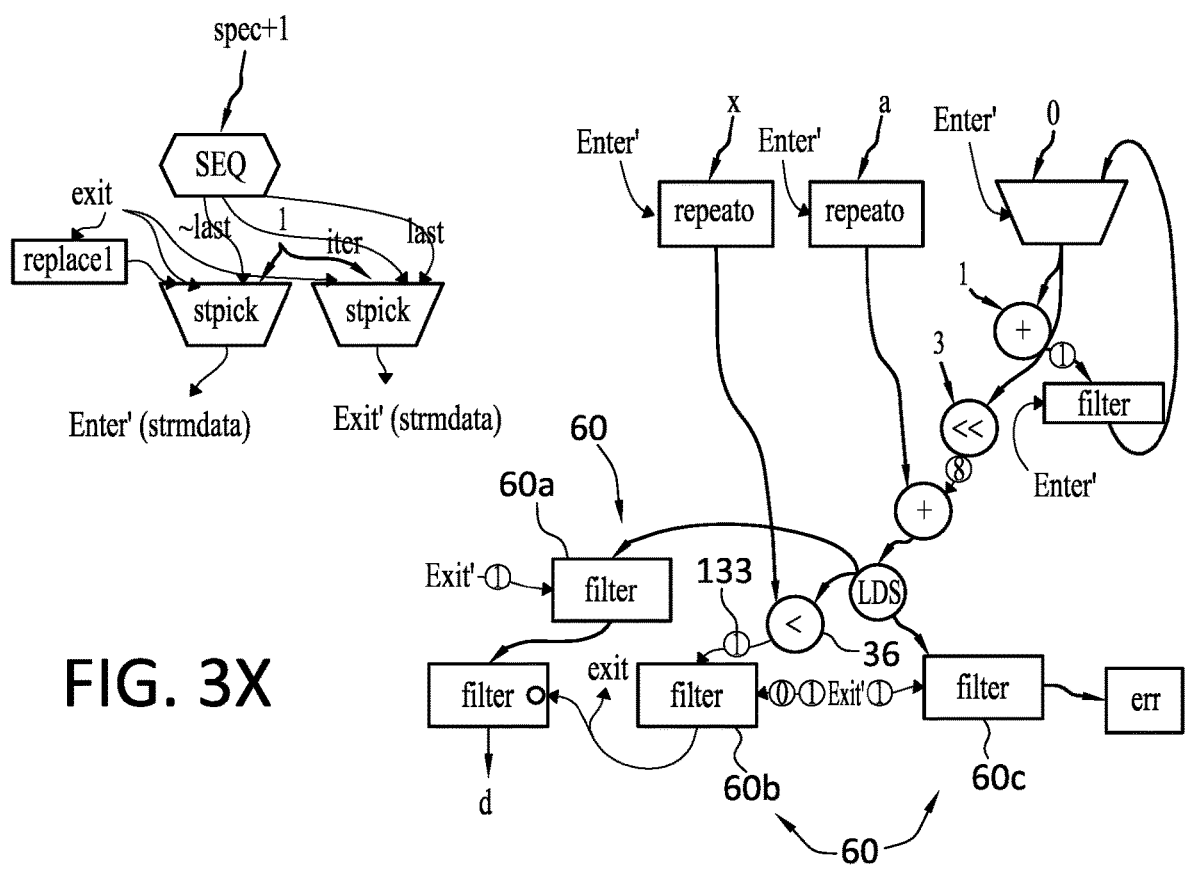

FIGS. 3A-3X show dataflow graphs for the sequential operation of a speculative control loop. As best shown in FIG. 3A, the sequencer node 54 is initialized with a dataflow token 88 that sets the fixed number of iterations (e.g., two speculative loops injected) plus one at the value of three. Additionally, the repeat node 32 is initialized with a dataflow token 90 that sets the base address of the array a[i] to zero and a dataflow token 92 gives the repeat node 38 a value of two for the variable x. In an embodiment, the Exit' signal is initialized with a dataflow token 94 having a value of one, where the pick node 24 is initialized with a dataflow token 96 having a value of zero.

As best shown in FIG. 3B, the sequencer node 54 accepts a state change in accordance with the dataflow token 88 and outputs a dataflow token 98 of value zero as the last value. The illustrated sequencer node 54 also outputs a dataflow token 100 of value one as the iterate value and a dataflow token 102 of value one as the inverted last value. Additionally, the pick node 24 outputs the dataflow token 96 to both the summation node 26 and the shift node 30.

As best shown in FIG. 3C, the sequencer node 54 may then output another dataflow token 104 of value zero as the last value, a dataflow token 106 of value one as the iterate value, and a dataflow token 108 of value one as the inverted last value. In the illustrated example, the first stream pick node 56 outputs the dataflow token 102 as the Enter' signal, which is provided to the stream pick node 24, the repeat node 32, the repeat node 38 and the filter node 28 in the loop portion 52. Additionally, the summation node 26 may output a dataflow token 110 of value one to the filter node 28 (e.g., to increment to the next value of i). In an embodiment, the shift node 30 outputs a dataflow token 112 of value zero to represent no address shifting taking place.

As best shown in FIG. 3D, the sequencer node 54 may then output another dataflow token 114 of value one as the iterate value and a dataflow token 116 of value zero as the inverted last value. The repeat node 38 may also output the dataflow token 92 to the compare node 36, where the illustrated repeat node 32 outputs the dataflow token 90 to the summation node 33. In one example, the repeat node 38 generates another dataflow token 120 of value two. Similarly, the repeat node 32 may generate another dataflow token 124 of value zero. In an embodiment, the filter node 28 outputs the dataflow token 110 to the pick node 24.

As best shown in FIG. 3E, the illustrated sequencer node 54 outputs another dataflow token 118 of value one as the last value. The repeat node 38 may also output another dataflow token 120 of value two to the compare node 36. In an embodiment, the summation node 33 outputs a dataflow token 122 of address value zero. Additionally, the pick node 24 outputs the dataflow token 110 to both the summation node 26 and the shift node 30.

As best shown in FIG. 3F, the sequencer node 54 may output another dataflow token 126 of value zero as the iterate value. The speculative load node 64 may accept the dataflow token 122 and load a value from the address indicated by the dataflow token 122, where the shift node 30 outputs a dataflow token 128 of value eight (e.g., to trigger a shift of three bits) in response to the dataflow token 110 (FIG. 3E). Additionally, the illustrated summation node 26 outputs a dataflow token 130 of value two to the filter node 28 (e.g., to increment to the next value of a[i]).

As best shown in FIG. 3G, the illustrated speculative load node 64 outputs the loaded value as a dataflow token 134 of value zero to a first cleanup filter node 60a and a dataflow token 136 of value zero to the compare node 36. The speculative load node 64 may also output a dataflow token 138 of value one to a third cleanup filter node 60c to indicate that the load was successful. Additionally, the summation node 33 may output a dataflow token 132 of value eight as the address of the next element in a[i]. In an embodiment, the filter node 28 outputs the dataflow token 130 to the pick node 24.

As best shown in FIG. 3H, the first cleanup filter node 60a may output the dataflow token 134 to the filter node 40. Additionally, the compare node 36 may output a dataflow token 142 of value one to a second cleanup filter node 60b (e.g., to indicate that the value of d is less than x). In one example, the third cleanup filter node 60c outputs the dataflow token 138 to the error node 62. The speculative load node 64 may accept the dataflow token 132 and load a value from the address indicated by the dataflow token 132.

As best shown in FIG. 3I, the illustrated second cleanup filter node 60b outputs the dataflow token 142 to the filter node 40. The dataflow token 142 may also be provided as an exit signal to a replace node 144, the first stream pick node 56, and the second stream pick node 58. In an embodiment, the illustrated speculative load node 64 outputs the loaded value as a dataflow token 146 of value one to the first cleanup filter node and a dataflow token 148 of value one to the compare node 36. The speculative load node 64 may also output a dataflow token 150 of value one to the third cleanup filter node 60c to indicate that the load was successful. Additionally, the illustrated shift node 30 outputs a dataflow token 151 of value sixteen (e.g., to trigger another shift of three bits) in response to the dataflow token 130 (FIG. 3H). In one example, the summation node 26 outputs a dataflow token 152 of value three to the filter node 28.

As best shown in FIG. 3J, the first stream pick node 56 and the second stream pick node 58 output the dataflow token 142 as the Enter' and Exit' signals, respectively. Additionally, the illustrated compare node 36 outputs a dataflow token 154 of value one to the second cleanup filter node 60b (e.g., to indicate that the value of d is less than x).

As best shown in FIG. 3K, the dataflow token 154 may be provided by the second cleanup filter node 60b as an exit signal to the replace node 144, the first stream pick node 56, and the second stream pick node 58. Additionally, the illustrated second cleanup filter node 60b outputs the dataflow token 154 to the filter node 40 and the first cleanup filter node 60a outputs the dataflow token 146 to the filter node 40. In an embodiment, the repeat node 38 also outputs another dataflow token 158 of value two to the compare node 36 and the repeat node 32 outputs another dataflow token 160 of value zero to the summation node 33. In one example, the third cleanup filter node 60c outputs the dataflow token 150 to the error node 62 and the filter node 28 outputs the dataflow token 152 to the pick node 24.

As best shown in FIG. 3L, the summation node 33 may output a dataflow token 162 of value sixteen as the address of the next element in a[i]. In an embodiment, the pick node 24 outputs the dataflow token 152 to both the summation node 26 and the shift node 30.

As best shown in FIG. 3M, the replace node 144 outputs a dataflow token 164 of value one to the first stream pick node 56 and the second stream pick node 58 outputs a dataflow token 166 of value one as the Exit' signal. The illustrated speculative load node 64 accepts the dataflow token 162 and loads a value from the address indicated by the dataflow token 162, where the shift node 30 outputs a dataflow token 170 of value twenty-four (e.g., to trigger another shift of three bits) in response to the dataflow token 152 (FIG. 3L). In one example, the summation node 26 outputs a dataflow token 172 of value four to the filter node 28.

As best shown in FIG. 3N, the first stream pick node 56 outputs a dataflow token 174 of value one as the Enter' signal, which is provided to the repeat node 38, the repeat node 32, the pick node 24 and the filter node 28. The illustrated cleanup filter nodes 60 receive the dataflow token 166 as the Exit' signal.

As best shown in FIG. 3O, the illustrated speculative load node 64 outputs the loaded value as a dataflow token 182 of value two to the first cleanup filter node 60*a* and a dataflow token 180 of value two to the compare node 36. The speculative load node 64 may also output a dataflow token 178 of value one to the third cleanup filter node 60*c* to indicate that the load was successful. In an embodiment, the repeat node 38 also outputs another dataflow token 184 of value two to the compare node 36 and the repeat node 32 outputs another dataflow token 186 of value zero to the summation node 33. In the illustrated example, the filter node 28 outputs the dataflow token 172 to the stream pick node 24.

As best shown in FIG. 3P, the first cleanup filter node 60*a* outputs the dataflow token 182 to the filter node 40 and the illustrated compare node 36 outputs a dataflow token 188 of value zero to the second cleanup filter node 60*b* (e.g., to indicate that the value of d is not less than x). In one example, the third cleanup filter node 60*c* outputs the dataflow token 178 to the error node 62. Additionally, the summation node 33 may output a dataflow token 190 of value twenty-four as the address of the next element in a[i]. In an embodiment, the pick node 24 outputs the dataflow token 172 to both the summation node 26 and the shift node 30.

As best shown in FIG. 3Q, the dataflow token 192 may be provided by the second cleanup filter node 60*b* as an exit signal to the replace node 144, the first stream pick node 56, and the second stream pick node 58. Additionally, the illustrated second cleanup filter node 60*b* outputs the dataflow token 192 to the filter node 40 to ensure that the actual loop result is returned before speculation completes. The illustrated speculative load node 64 accepts the dataflow token 190 and loads a value from the address indicated by the dataflow token 190, where the shift node 30 outputs a dataflow token 194 of value thirty-two (e.g., to trigger another shift of three bits) in response to the dataflow token 172 (FIG. 3P). In one example, the summation node 26 outputs a dataflow token 196 of value five to the filter node 28.

As best shown in FIG. 3R, the illustrated replace node 144 outputs a dataflow token 101 of value one and a dataflow token 103 of value zero in response to the dataflow token 192 (FIG. 3Q). Additionally, the cleanup values may begin streaming. For example, The second stream pick node 58 outputs the dataflow token 98 (e.g., from the last value input) as the Exit' signal, which is provided to the cleanup filter nodes 60. In an embodiment, the filter node 40 outputs the dataflow token 182 as the actual loop result (e.g., d). At this point, a non-speculative loop would have been considered complete. The speculative loop embodiment will continue execution for some time, removing speculative tokens. In one example, the speculative load node 64 outputs the loaded value as a dataflow token 105 of value three to the first cleanup filter node 60*a* and a dataflow token 107 of value three to the compare node 36. The speculative load node 64 may also output a dataflow token 109 of value one to the third cleanup filter node 60*c* to indicate that the load was successful.

As best shown in FIG. 3S, the first stream pick node 56 outputs the dataflow token 192 (e.g., from the exit signal input) as the Enter' signal, which is provided to the repeat node 38, the repeat node 32, the pick node 24 and the filter node 28. Additionally, the second stream pick node 58 may output the dataflow token 104 (e.g., from the last signal input) as the Exit' signal, which is provided to the cleanup filter nodes 60. In an embodiment, the second cleanup filter node 60*b* outputs a dataflow token 111 as the exit signal. Moreover, illustrated compare node 36 outputs a dataflow token 113 of value zero to the second cleanup filter node 60*b* (e.g., to indicate that the value of d is not less than x).

As best shown in FIG. 3T, the second stream pick node 58 may output the dataflow token 118 (e.g., from the last signal input) as the Exit' signal, where the Exit' signal is initialized for the next loop execution (e.g., self-cleaning the graph) via the dataflow token 118. In an embodiment, the repeat node 38 also outputs another dataflow token 115 of value two to the compare node 36 and the repeat node 32 outputs another dataflow token 117 of value zero to the summation node 33. Additionally, the first iteration of the next loop execution starts executing in response to the pick node 24 outputting an initialization dataflow token 119 of value zero to both the summation node 26 and the shift node 30.

As best shown in FIG. 3U, the summation node 33 outputs a dataflow token 121 of value thirty-two as the address of the next element in a[i], where the shift node 30 outputs a dataflow token 123 of value eight (e.g., to trigger a shift of three bits) in response to the dataflow token 119 (FIG. 3T). Additionally, the illustrated summation node 26 outputs a dataflow token 125 of value one to the filter node 28.

As best shown in FIG. 3V, illustrated speculative load node 64 accepts the dataflow token 121. The speculative load node 64 may also attempt to load a value from the address indicated by the dataflow token 121.

As best shown in FIG. 3W, the speculative load node 64 outputs a dataflow token 127 of value zero to the first cleanup filter node 60*a* and a dataflow token 129 of value zero to the compare node 36. The speculative load node 64 may also output a dataflow token 131 of value zero to the third cleanup filter node 60*c* to indicate that the load was unsuccessful (e.g., failed translation). In an embodiment, the failure is ignored due to being speculative.

As best shown in FIG. 3X, the illustrated compare node 36 outputs a dataflow token 133 of value one to the second cleanup filter node 60*b* (e.g., to indicate that the value of d is less than x). Because the illustrated "lookahead loop" technology forces the control loop to speculatively execute for a fixed number of iterations in addition to the unspecified number of iterations, the performance impact of the length of the critical path may be significantly reduced. Moreover, the selective removal of dataflow tokens associated with the speculative execution enables the performance advantages to be achieved without the use of additional hardware.

Dealing With Memory

Speculation within a fabric such as, for example, a configurable spatial accelerator (CSA) fabric, may be dealt with by injecting and removing dataflow tokens, as already discussed. Memory accesses, however, may have potentially global side effects, and therefore are dealt with in a slightly different fashion.

Load operations ("loads") often represent the majority of latency in computation. Therefore, parallelizing loads may be particularly advantageous. Fortunately, loads may be benignly speculated in most cases. There are a few cases, however, in which such speculation using basic load operations is not permitted. Chief among these cases is when a speculative load address triggers a protection violation in virtual memory translation. Normally, such a violation would cause program termination. Other less common situations include load operations to certain regions of memory such as I/O (input/output) space, which may have side effects that would render speculative access illegal or harmful. To handle these cases, a new speculative load operation is introduced. This operation returns the value of the target memory address if the operation succeeds, but will return zero in the case of failure. Additionally, a Boolean token may be provided to indicate whether the operation succeeded or failed.

FIG. 4 shows an example of a speculative load operation 135. Although the speculative load operation 135 circumvents protection violations enforcement by the hardware, it may still be useful for the programmer to be notified that a non-speculative loop execution has encountered a protection violation. As already noted, an error handler such as, for example, the error node 62 (FIG. 1C), may determine whether non-speculative instances of the load encountered protection violations. If a violation is encountered, a message may be sent to software using existing fabric mechanisms.

Although the baseline operation may work well in nearly all use cases, the handling of less common memory types may be improved through the inclusion of the speculative loop control as an argument to the load operation. For "well-behaved" memory types (e.g., cacheable), this control may be ignored by hardware, with memory operations being issued as soon as address and dependency tokens are available (e.g., whether the instance is speculative or not). If, however, the address translation detects more complex types such as, for example, I/O space, the operation might stall waiting for the loop control to be resolved via the speculative input (e.g., effectively squashing speculative accesses). The microarchitecture may opt for conservative handling of the operation as soon as the first conservative-typed memory translation is detected and may periodically revert to an aggressive mode, for example, based on a counter.

Unlike loads, speculative store operations ("stores") may involve hardware support to unwind. Stores, however, are rarely on the critical path of a computation. Therefore, permitting stores to wait for the calculation of the true loop control before being sent to memory (or committing) may be acceptable. The values and addresses to be stored may still be speculatively calculated and then removed by a filter controlled using the speculative loop exit control (e.g., the Exit' signal). Accordingly, waiting to store may not impact overall loop performance. Similarly, ordering tokens used to enforce memory consistency may not be subject to speculation. In an embodiment, operations using such tokens are wrapped with filtering operations appropriately.

Improving Translation Performance

One potential microarchitectural issue associated with load speculation is occasional spurious address translations, which may occur when speculative accesses cross into invalid pages. Although when using the speculative load operation as described herein, crossing into invalid pages does not result in incorrect execution, spurious page walks that degrade application performance may be encountered. To ameliorate this issue, annotations may be made in the TLB hierarchy (e.g., at the level 2/L2 TLB) that indicate a virtual page as being non-translatable. Thus, rather than triggering a page walk for each speculative access, the application may instead only encounter an L1 (level 1) TLB miss in the worst case, and no penalty if the non-translations are cached at L1.

FIG. 5 shows a chart 137 of the relationship between cycles and total loop trips for various levels of control speculation. The chart 137 demonstrates that for relatively low levels of speculation, the number cycles is at advantageously low levels (e.g., enhanced performance).

Figure 6:
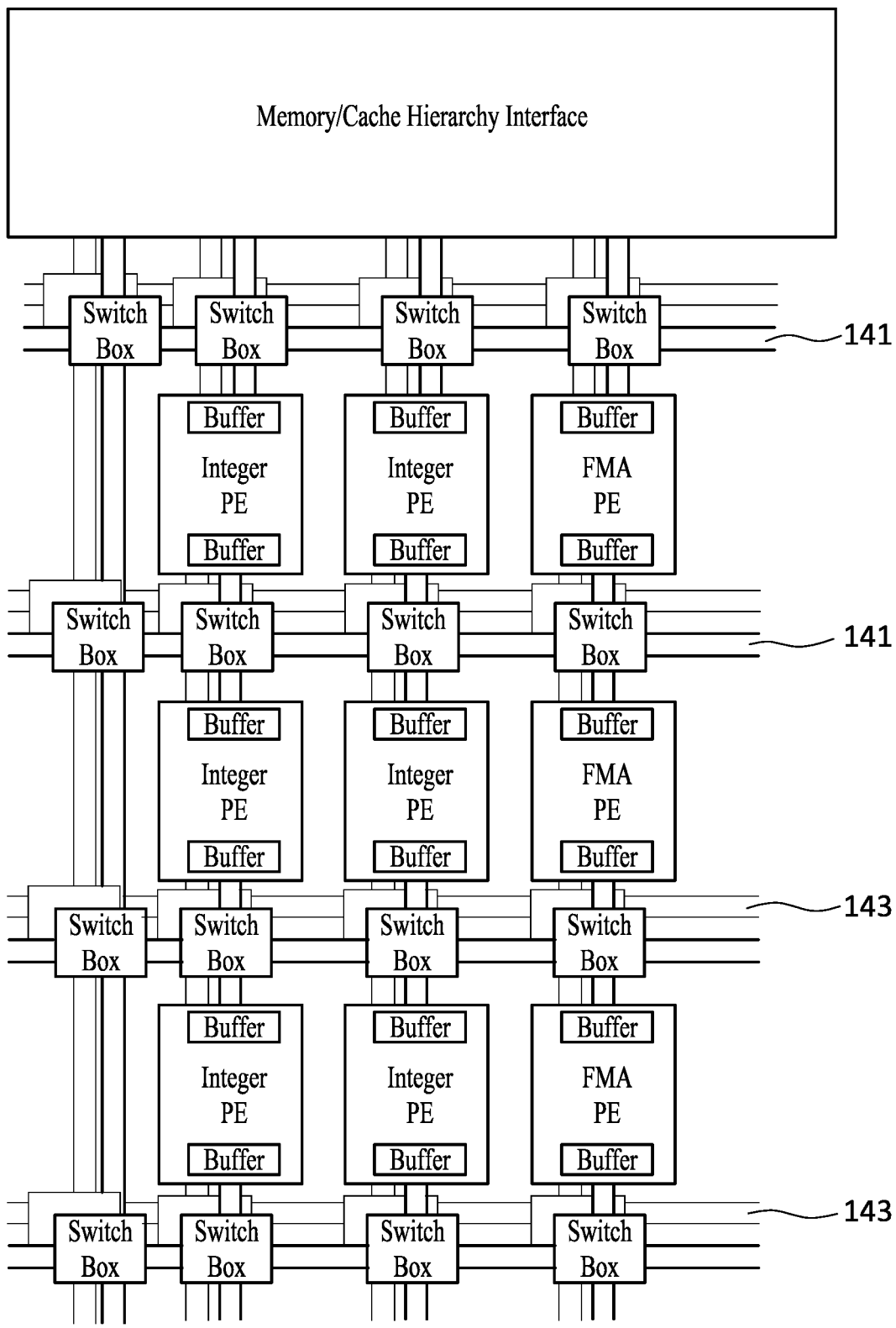
FIG. 6 is a block diagram of an example of a dataflow architecture according to an embodiment.

Turning now to FIG. 6, a dataflow architecture 139 (e.g., CSA) is shown in which a light-weight processing element (PE) array includes circuit-switched components 141 and statically configured communications channels 143. In an embodiment the PE array includes integer PEs and fused multiply add (FMA) PEs. In one example, a dataflow graph control portion such as, for example, the control portion 50 (FIG. 1B), and a dataflow graph loop portion such as, for example, the loop portion 52 (FIG. 1C), are mapped onto the architecture 139 by configuring the PEs and the network. Generally, the PEs are configured as dataflow operators, similar to functional units in a processor: once all input operands arrive at the PE, some operation occurs, and results are forwarded to downstream PEs in a pipelined fashion. Dataflow operators may choose to consume incoming data on a per-operator basis. Simple operators, such as those handling the unconditional evaluation of arithmetic expressions often consume all incoming data. It is sometimes useful, however, for operators to maintain state, for example, in accumulation.

In an embodiment, the PEs communicate using dedicated virtual circuits that are formed by statically configuring the circuit-switched communications network. These virtual circuits are flow controlled and fully back-pressured, such that PEs will stall if either the source has no data or destination is full. At runtime, data flows through the PEs implementing the mapped algorithm. For example, data may be streamed in from memory, through the fabric, and then back out to memory. The graph synthesis technology described herein may target such spatial architectures.

Figure 7:
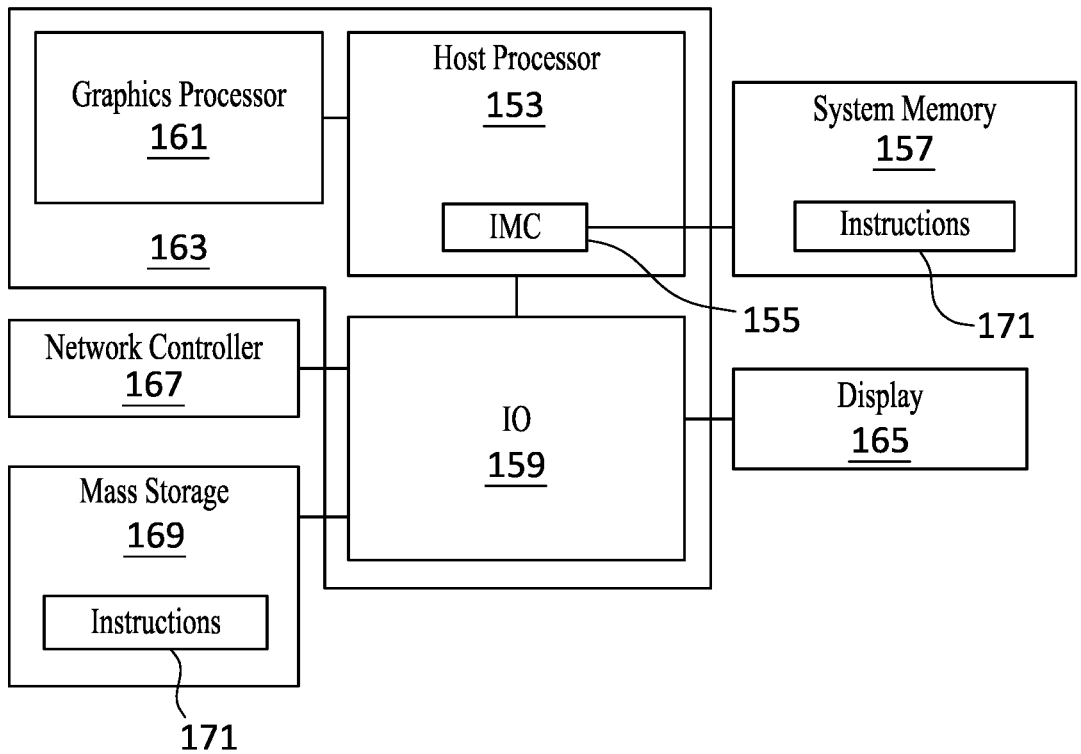
FIG. 7 is a block diagram of an example of a performance-enhanced computing system according to an embodiment.

Turning now to FIG. 7, a performance-enhanced computing system 151 is shown. The system 151 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), etc., or any combination thereof. In the illustrated example, the system 151 includes a host processor 153 (e.g., central processing unit/CPU with a plurality of PEs and/or cores) having an integrated memory controller (WIC) 155 that is coupled to a system memory 157.

The illustrated system 151 also includes an input output (IO) module 159 implemented together with the host processor 153 and a graphics processor 161 on a semiconductor die 163 as a system on chip (SoC). The illustrated IO module 159 communicates with, for example, a display 165 (e.g., touch screen, liquid crystal display/LCD, light emitting diode/LED display), a network controller 167 (e.g., wired and/or wireless NIC), and mass storage 169 (e.g., hard disk drive/HDD, optical disk, solid state drive/SSD, flash memory).

In an embodiment, the host processor 153, the graphics processor 161 and/or the IO module 159 execute program instructions 171 retrieved from the system memory 157 and/or the mass storage 169 to perform one or more aspects of the method 70 (FIG. 2A) and/or the method 80 (FIG. 2B), already discussed. Thus, execution of the illustrated instructions 171 may cause the computing system 151 to determine that a control loop is to be executed for an unspecified number of iterations and force the control loop to be executed for a fixed number of iterations in addition to the unspecified number of iterations, where execution of the control loop for the fixed number of iterations is conducted in parallel. Execution of the instructions 171 may also cause the computing system 151 remove one or more dataflow tokens associated with the execution of the control loop for the fixed number of iterations.

The computing system 151 may therefore be considered performance-enhanced to the extent that execution of the instructions 171 forces the control loop to speculatively execute for a fixed number of iterations in addition to the unspecified number of iterations, which enables the performance impact of the length of the critical path to be significantly reduced. Moreover, the selective removal of dataflow tokens associated with the speculative execution enables the performance advantages to be achieved without the use of additional hardware.

Figure 8:
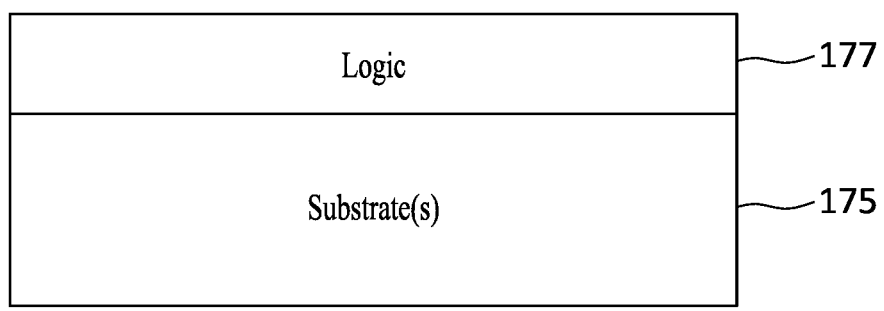
FIG. 8 is an illustration of an example of a semiconductor apparatus according to an embodiment.

FIG. 8 shows a semiconductor package apparatus 173. The illustrated apparatus 173 includes one or more substrates 175 (e.g., silicon, sapphire, gallium arsenide) and logic 177 (e.g., transistor array and other integrated circuit/IC components) coupled to the substrate(s) 175. The logic 177 may be implemented at least partly in configurable logic or fixed-functionality logic hardware. In one example, the logic 177 implements one or more aspects of the method 70 (FIG. 2A) and/or the method 80 (FIG. 2B), already discussed. Thus, the logic 177 may automatically determine that a control loop is to be executed for an unspecified number of iterations and force the control loop to be executed for a fixed number of iterations in addition to the unspecified number of iterations, where execution of the control loop for the fixed number of iterations is conducted in parallel. The logic 177 may also automatically cause the computing system 151 remove one or more dataflow tokens associated with the execution of the control loop for the fixed number of iterations.

The apparatus 173 may therefore be considered performance-enhanced to the extent that the logic 177 forces the control loop to speculatively execute for a fixed number of iterations in addition to the unspecified number of iterations, which enables the performance impact of the length of the critical path to be significantly reduced. Moreover, the selective removal of dataflow tokens associated with the speculative execution enables the performance advantages to be achieved without the use of additional hardware.

In one example, the logic 177 includes transistor channel regions that are positioned (e.g., embedded) within the substrate(s) 175. Thus, the interface between the logic 177 and the substrate(s) 175 may not be an abrupt junction. The logic 177 may also be considered to include an epitaxial layer that is grown on an initial wafer of the substrate(s) 175.

Figure 9:
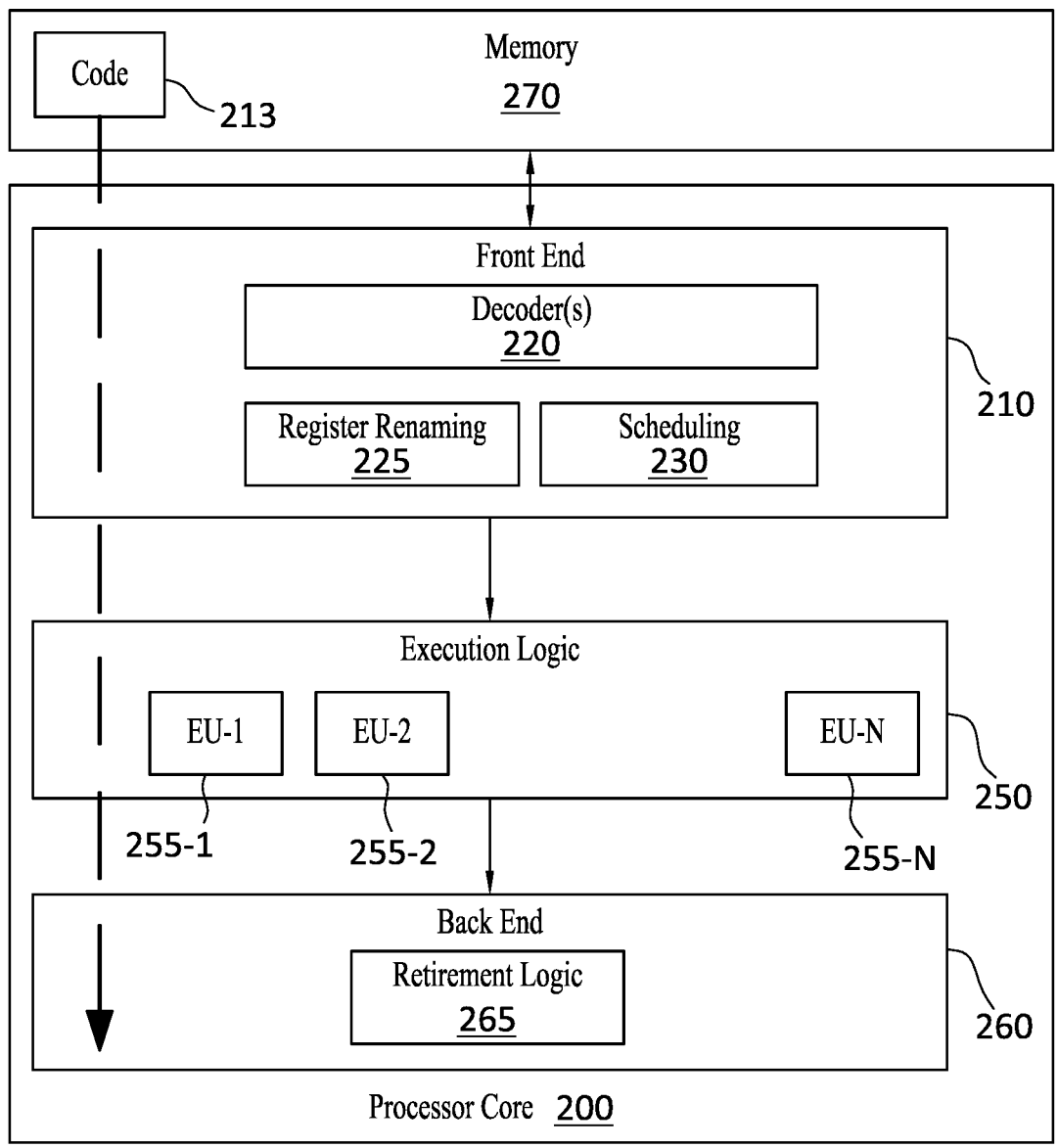
FIG. 9 is a block diagram of an example of a processor according to an embodiment.

FIG. 9 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 9, a processing element may alternatively include more than one of the processor core 200 illustrated in FIG. 9. The processor core 200 may be a single-threaded core or, for at least one embodiment, the processor core 200 may be multithreaded in that it may include more than one hardware thread context (or "logical processor") per core.

FIG. 9 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 70 (FIG. 2A) and/or the method 80 (FIG. 2B), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 9, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 10, shown is a block diagram of a computing system 1000 embodiment in accordance with an embodiment. Shown in FIG. 10 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 10 may be implemented as a multi-drop bus rather than point-to-point interconnect.

As shown in FIG. 10, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 9.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 10, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 10, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 10, various I/O devices 1014 (e.g., biometric scanners, speakers, cameras, sensors) may be coupled to the first bus 1016, along with a bus bridge 1018 which may couple the first bus 1016 to a second bus 1020.

In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement one or more aspects of the method 70 (FIG. 2A) and/or the method 80 (FIG. 2B), already discussed. Further, an audio I/O 1024 may be coupled to second bus 1020 and a battery 1010 may supply power to the computing system 1000.

Note that other embodiments are contemplated. For example, instead of the point-to-point architecture of FIG. 10, a system may implement a multi-drop bus or another such communication topology. Also, the elements of FIG. 10 may alternatively be partitioned using more or fewer integrated chips than shown in FIG. 10.

Additional Notes and Examples

Example 1 includes a performance-enhanced computing system including a network controller and a processor coupled to the network controller, the processor including logic coupled to one or more substrates, wherein the logic is to determine that a control loop is to be executed for an unspecified number of iterations and force the control loop to be executed for a fixed number of iterations in addition to the unspecified number of iterations, wherein execution of the control loop for the fixed number of iterations is to be conducted in parallel.

Example 2 includes the system of Example 1, wherein the logic coupled to the one or more substrates is to remove one or more dataflow tokens associated with the execution of the control loop for the fixed number of iterations.

Example 3 includes the system of any one of Examples 1 to 2, wherein the control loop is to involve a load from a memory address, and wherein the logic coupled to the one or more substrates is to generate a signal indicating whether the load was successful.

Example 4 includes the system of Example 3, wherein the load is to be from an input/output (IO) memory address.

Example 5 includes the system of Example 3, wherein the load is to be from a virtual memory address.

Example 6 includes the system of Example 5, wherein the logic coupled to the one or more substrates is to detect that the load was unsuccessful due to a non-cacheable memory mode anomaly, and annotate one or more virtual pages as being non-translatable in response to the anomaly.

Example 7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to determine that a control loop is to be executed for an unspecified number of iterations, and force the control loop to be executed for a fixed number of iterations in addition to the unspecified number of iterations, wherein execution of the control loop for the fixed number of iterations is to be conducted in parallel.

Example 8 includes the semiconductor apparatus of Example 7, wherein the logic coupled to the one or more substrates is to remove one or more dataflow tokens associated with the execution of the control loop for the fixed number of iterations.

Example 9 includes the semiconductor apparatus of any one of Examples 7 to 8, wherein the control loop is to involve a load from a memory address, and wherein the logic coupled to the one or more substrates is to generate a signal indicating whether the load was successful.

Example 10 includes the semiconductor apparatus of Example 9, wherein the load is to be from an input/output (TO) memory address.

Example 11 includes the semiconductor apparatus of Example 9, wherein the load is to be from a virtual memory address.

Example 12 includes the semiconductor apparatus of Example 11, wherein the logic coupled to the one or more substrates is to detect that the load was unsuccessful due to a non-cacheable memory mode anomaly, and annotate one or more virtual pages as being non-translatable in response to the anomaly.

Example 13 includes at least one computer readable storage medium comprising a set of executable program instructions, which when executed by a computing system, cause the computing system to determine that a control loop is to be executed for an unspecified number of iterations, and force the control loop to be executed for a fixed number of iterations in addition to the unspecified number of iterations, wherein execution of the control loop for the fixed number of iterations is to be conducted in parallel.

Example 14 includes the at least one computer readable storage medium of Example 13, wherein the program instructions, when executed, cause the computing system to remove one or more dataflow tokens associated with the execution of the control loop for the fixed number of iterations.

Example 15 includes the at least one computer readable storage medium of any one of Examples 13 to 14, wherein the control loop is to involve a load from a memory address, and wherein the program instructions, when executed, cause the computing system to generate a signal indicating whether the load was successful.

Example 16 includes the at least one computer readable storage medium of Example 15, wherein the load is to be from an input/output (IO) memory address.

Example 17 includes the at least one computer readable storage medium of Example 15, wherein the load is to be from a virtual memory address.

Example 18 includes the at least one computer readable storage medium of Example 17, wherein the program instructions, when executed, cause the computing system to detect that the load was unsuccessful due to a non-cacheable memory mode anomaly, and annotate one or more virtual pages as being non-translatable in response to the anomaly.

Example 19 includes a method comprising determining that a control loop is to be executed for an unspecified number of iterations, and forcing the control loop to be executed for a fixed number of iterations in addition to the unspecified number of iterations, wherein execution of the control loop for the fixed number of iterations is conducted in parallel.

Example 20 includes the method of Example 19, further including removing one or more dataflow tokens associated with the execution of the control loop for the fixed number of iterations.

Example 21 includes the method of any one of Examples 19 to 20, wherein the control loop involves a load from a memory address, and wherein the method further includes generating a signal indicating whether the load was successful.

Example 22 includes the method of Example 21, wherein the load is from an input/output (TO) memory address.

Example 23 includes the method of Example 21, wherein the load is from a virtual memory address.

Example 24 includes the method of Example 23, further including detecting that the load was unsuccessful due to a non-cacheable memory mode anomaly, and annotating one or more virtual pages as being non-translatable in response to the anomaly.

Example 25 includes means for performing the method of any one of Examples 19 to 24.

Thus, technology described herein improves the performance of many dataflow graphs by integral multiples over baselines, and therefore improves the applicability of dataflow architectures in general. The technology also requires no or few modifications to existing hardware.

Embodiments are applicable for use with all types of semiconductor integrated circuit ("IC") chips. Examples of these IC chips include but are not limited to processors, controllers, chip set components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

I claim:

1. A computing system comprising:
a network controller; and
a processor coupled to the network controller, the processor including logic coupled to one or more substrates, wherein the logic is to:
determine that a control loop is to be executed for an unspecified number of iterations;
execute the control loop for a first speculative iteration that is to involve a speculative load operation;
return a value of a target memory address if the speculative load operation is successful; and
return a value of zero if the speculative load operation is unsuccessful.

2. The computing system of claim 1, wherein the speculative load operation is to include a load from a virtual memory address.

3. The computing system of claim 1, wherein the speculative load operation is to circumvent protection violations enforcement by hardware.

4. The computing system of claim 1, wherein the logic coupled to the one or more substrates is to wait to store values and addresses of a store operation of the control loop during the execution of the first speculative iteration of the control loop.

5. The computing system of claim 4, wherein the logic coupled to the one or more substrates is to determine whether to send the values and the addresses of the store operation to memory based on a calculation of a loop control associated with the control loop.

6. The computing system of claim 1, wherein the logic coupled to the one or more substrates is to execute the control loop for a fixed number of speculative iterations in parallel.

7. A semiconductor apparatus comprising:
one or more substrates; and
logic coupled to the one or more substrates, wherein the logic is implemented at least partly in one or more of configurable logic or fixed-functionality logic hardware, the logic coupled to the one or more substrates to:
determine that a control loop is to be executed for an unspecified number of iterations;
execute the control loop for a first speculative iteration that is to involve a speculative load operation;
return a value of a target memory address if the speculative load operation is successful; and
return a value of zero if the speculative load operation is unsuccessful.

8. The semiconductor apparatus of claim 7, wherein the speculative load operation is to include a load from a virtual memory address.

9. The semiconductor apparatus of claim 7, wherein the speculative load operation is to circumvent protection violations enforcement by hardware.

10. The semiconductor apparatus of claim 7, wherein the logic coupled to the one or more substrates is to wait to store values and addresses of a store operation of the control loop during the execution of the first speculative iteration of the control loop.

11. The semiconductor apparatus of claim 10, wherein the logic coupled to the one or more substrates is to determine whether to send the values and the addresses of the store operation to memory based on a calculation of a loop control associated with the control loop.

12. The semiconductor apparatus of claim 7, wherein the logic coupled to the one or more substrates is to execute the control loop for a fixed number of speculative iterations in parallel.

13. At least one non-transitory computer-readable storage medium storing a set of executable program instructions, which when executed by a computing system, cause the computing system to:
determine that a control loop is to be executed for an unspecified number of iterations;
execute the control loop for a first speculative iteration that is to involve a speculative load operation;
return a value of a target memory address if the speculative load operation is successful; and
return a value of zero if the speculative load operation is unsuccessful.

14. The at least one non-transitory computer-readable storage medium of claim 13, wherein the speculative load operation is to include a load from a virtual memory address.

15. The at least one non-transitory computer-readable storage medium of claim 13, wherein the speculative load operation is to circumvent protection violations enforcement by hardware.

16. The at least one non-transitory computer-readable storage medium of claim 13, wherein the set of executable program instructions, which when executed by the computing system, cause the computing system to wait to store values and addresses of a store operation of the control loop during the execution of the first speculative iteration of the control loop.

17. The at least one non-transitory computer-readable storage medium of claim 16, wherein the set of executable program instructions, which when executed by the computing system, cause the computing system to determine whether to send the values and the addresses of the store operation to memory based on a calculation of a loop control associated with the control loop.

18. The at least one non-transitory computer-readable storage medium of claim 13, wherein the set of executable program instructions, which when executed by the computing system, cause the computing system to execute the control loop for a fixed number of speculative iterations in parallel.

19. A method comprising:
determining that a control loop is to be executed for an unspecified number of iterations;
executing the control loop for a first speculative iteration that involves a speculative load operation;
returning a value of a target memory address if the speculative load operation is successful; and
returning a value of zero if the speculative load operation is unsuccessful.

20. The method of claim 19, wherein the speculative load operation includes a load from a virtual memory address.

21. The method of claim 19, wherein the speculative load operation circumvents protection violations enforcement by hardware.

22. The method of claim 19, further including waiting to store values and addresses of a store operation of the control loop during the execution of the first speculative iteration of the control loop.

23. The method of claim 22, further including determining whether to send the values and the addresses of the store operation to memory based on a calculation of a loop control associated with the control loop.

24. The method of claim 19, further including executing the control loop for a fixed number of speculative iterations in parallel.

\* \* \* \* \*